United States Patent
Kim et al.

(10) Patent No.: US 7,594,153 B2
(45) Date of Patent: Sep. 22, 2009

(54) APPARATUS FOR CONTROLLING HYBRID AUTOMATIC REPEAT REQUEST (HARQ) IN A MOBILE COMMUNICATION SYSTEM

(75) Inventors: Min-Goo Kim, Suwon-shi (KR); Sang-Hyuck Ha, Suwon-shi (KR); Jin-Woo Heo, Sungnam-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 10/691,644

(22) Filed: Oct. 24, 2003

(65) Prior Publication Data

US 2004/0088634 A1    May 6, 2004

(30) Foreign Application Priority Data

Oct. 24, 2002    (KR) .................... 10-2002-0065355

(51) Int. Cl.
     *H03M 13/00*    (2006.01)
(52) U.S. Cl. .................... 714/751; 714/748; 714/749
(58) Field of Classification Search ......... 714/748–749, 714/751
     See application file for complete search history.

(56) References Cited

U.S. PATENT DOCUMENTS

| | | | | |
|---|---|---|---|---|
| 5,946,320 | A * | 8/1999 | Decker .................... | 370/428 |
| 6,421,803 | B1 * | 7/2002 | Persson et al. ............... | 714/752 |
| 6,658,005 | B2 * | 12/2003 | Seidel et al. ................ | 370/394 |
| 6,760,860 | B1 * | 7/2004 | Fong et al. ..................... | 714/4 |

FOREIGN PATENT DOCUMENTS

| | | |
|---|---|---|
| EP | 1156617 | 11/2001 |
| JP | 09-116597 | 2/1997 |
| JP | 2001-358699 | 12/2001 |
| KR | 2001 0107647 A | 12/2001 |
| KR | 2002 0000514 A | 1/2002 |

(Continued)

OTHER PUBLICATIONS

Arnab Das et al., "Design and Performance of Down Link Shared Control Channel for HSDPA", *13th IEEE International Symposium on Personal Indoor and Mobile Radio*, vol. 3, pp. 1088-1091 (Sep. 15, 2002).

(Continued)

*Primary Examiner*—Cynthia Britt
*Assistant Examiner*—Steve Nguyen
(74) *Attorney, Agent, or Firm*—Roylance, Abrams, Berdo & Goodman L.L.P.

(57) ABSTRACT

An apparatus for controlling a Hybrid Automatic Repeat Request (HARQ) is provided. In the apparatus, a physical layer includes a decoder for decoding a control message received over the packet data control channel, a demodulator for demodulating packet data received over the packet data channel, and a turbo decoder for decoding the demodulated packet data. A physical layer's HARQ controller determines whether to demodulate and decode the received packet data depending on a decoding result of the control message, outputs the decoded control message to the demodulator and the turbo decoder for demodulation and decoding of the received packet data, controls output of a response signal according to decoding result of the packet data, and delivers the turbo-decoded packet data to an upper layer.

19 Claims, 15 Drawing Sheets

FOREIGN PATENT DOCUMENTS

| | | |
|---|---|---|
| KR | 2002 0014941 A | 2/2002 |
| KR | 0231094 | 4/2002 |
| KR | 0231095 | 4/2002 |
| KR | 0231096 | 4/2002 |
| KR | 038553 | 1/2003 |
| KR | 0231096 | 3/2003 |
| WO | 0120874 | 3/2001 |

OTHER PUBLICATIONS

Robert Van Nobelen et al., "An Adaptive Radio Link Protocol with Enhanced Data Rates for GSM Evolution", *IEEE Personal Communications, IEEE Communications Society*, US, pp. 54-64, vol. 6, No. 1. (Feb. 1999).

LG Electronics, "*Updated Joint Physical Layer Proposal for 1×EV-DV*," 3GPP2-C50-20010326-025; Seattle, WA; Mar. 29, 2001.

\* cited by examiner

APPARATUS FOR CONTROLLING HYBRID AUTOMATIC REPEAT REQUEST (HARQ) IN A MOBILE COMMUNICATION SYSTEM

PRIORITY

This application claims priority under 35 U.S.C. § 119 to an application entitled "Apparatus and Method for Controlling HARQ in a Mobile Communication System" filed in the Korean Intellectual Property Office on Oct. 24, 2002 and assigned Serial No. 2002-65355, the contents of which are incorporated herein by reference.

BACKGROUND OF THE INVENTION

1. Field of the Invention

The present invention relates generally to an apparatus and method for controlling Automatic Repeat reQuest (ARQ) in a high-speed data transmission system, and in particular, to an apparatus and method for controlling hybrid automatic repeat request(HARQ) in a high-speed data transmission system.

2. Description of the Related Art

Mobile communication systems have been developed to provide a high-quality call service to moving users. With the development of mobile communication systems, research is being conducted on a method for transmitting increasing amounts of data to users. In addition, mobile communication systems have already been switched from an analog system to a digital system. Using the digital system, the mobile communication systems can now transmit increased amounts of data to users at higher speeds.

Generally, in digital mobile communication systems where a variation in channel condition is significant and different types of service traffic channels coexist with each other, a hybrid automatic repeat request (hereinafter referred to as "HARQ") scheme is used to meet a demand for high-speed data transmission, i.e., to increase transmission throughput. Particularly, as commercialization of a high-speed data transmission service is realized, analysis and research are actively performed on technology for efficiently applying a HARQ scheme using error correction codes with a variable code rate, rather than a HARQ scheme using existing error correction codes with a fixed code rate. For a channel structure for high-speed transmission, a method of using high-level modulation such as 8-ary phase shift keying (8-PSK) and 16-ary quadrature amplitude modulation (16-QAM) beside the general binary phase shift keying (BPSK) or quadrature phase shift keying (QPSK), as a modulation scheme, is also taken into consideration.

Currently, a Code Division Multiple Access 2000 for Spreading Rate 1 (CDMA2000 1x) Evolution Data and Voice (EV-DV) system, which is a new transmission standard of a synchronous Third Generation Partnership Project (3GPP2) CDMA system, has adopted a coding scheme using quasi-complementary turbo codes (QCTC) as its standard. The quasi-complementary turbo codes provide a variable code rate to a coding scheme for an HARQ scheme over high-speed data and provide improvement in soft combining performance using HARQ. In the EV-DV system, packet data transmission/reception is performed by an HARQ or fast HARQ operation of a physical layer. This will be described in detail with reference to FIGS. 1 and 2.

FIG. 1 is a block diagram illustrating a relationship between an upper layer and a physical layer for ARQ processing commercially. Referring to FIG. 1, a physical layer 110 decodes data received over a radio channel and makes decoded frame data. The physical layer 110 delivers the decoded frame data to a MAC layer 120 as called an upper layer. The MAC layer 120 determines whether the decoded frame data received from the physical layer 110 has a Protocol Data Unit (MuxPDU) error. When an error occurs, the MAC layer 120 retransmits the defective data. However, when no error occurs, the MAC layer 120 transmits a new frame. When processing is performed in the MAC layer 120, since data decoded in the physical layer must be delivered to the upper layer to be processed, ARQ processing speed is decreased undesirably. In addition, since high-speed data process must be performed, a load on the MAC layer 120 is increased. Hence, there have been proposed methods in which an operation performed in the upper layer is performed in the physical layer. Such methods provide a structure in which an operation in the physical layer, i.e., hardware, is performed in the same way as an operation in software. In this context, if part of the operation of FIG. 1 is applied to the physical layer, a structure for processing part of an ARQ operation in the physical layer is provided as illustrated in FIG. 2.

FIG. 2 is a block diagram illustrating a relation between an upper layer and a physical layer for improved fast (physical) HARQ processing. With reference to FIG. 2, a description will now be made of a relationship between an upper layer and a physical layer for improved fast HARQ processing. A structure of FIG. 2 is realized when the structure of FIG. 1 is performed in the physical layer. It should be noted that such a structure has never been proposed up to now. In other words, it should be noted that the concept of FIG. 2 is expected by applying currently proposed methods, this has never been actually implemented, and no discussion has been made on the operations that will be described in the detailed description section below.

In FIG. 2, part of an ARQ operation that has been performed in a MAC layer 230 is performed in a physical layer or its intermediate layer, for fast ARQ response and processing. That is, in this scheme, a physical layer 200 has a basic physical layer 210 performing the same operation as that of FIG. 1, and an HARQ controller 220. The HARQ controller 220 performs part of the operation that was performed in the conventional MAC layer. Therefore, the HARQ controller 220 is included in the physical layer in structure, but performs part of an operation of the MAC layer 230 since the physical layer determines data retransmission, a processing time for the same data is shortened.

In addition, NAK transmission in the upper layer cannot perform soft combining for the same data, because the physical layer can maintain a soft combined value for each symbol. However, since data symbols delivered from the physical layer to the MAC layer are all expressed with a binary value (0 or 1), although a symbol is repeated by retransmission, there is no way to soft combine the repeated symbol. The only method is a majority voting method for calculating the number of 0s and 1s for symbols having a binary value, and comparing the number of 0s with the number of 1s thus to decide a majority symbol. However, this method also cannot be used in the upper layer because of its plenty calculations. On the contrary, NAK transmission in the physical layer enables soft combining of code symbols for the same encoder packet, contributing to efficient utilization of channel resources. Therefore, it is preferable to dispose the HARQ controller 220 under a multiplexing sublayer 230 of the MAC layer. That is, it is preferable for the MAC layer to perform an operation of the physical layer.

This structure has a fast processing time compared with a conventional ARQ control method operating based on a Radio Link Protocol (RLP). This will now be compared with the existing method. In the conventional method of FIG. 1, a NAK signal is received from one packet transmission, and a round trip delay of a minimum of about 200 msec occurs up to a time when a retransmission packet is transmitted due to the NAK signal. On the contrary, in the method of FIG. 2, HARQ generates a very short round trip delay of a minimum of about several milliseconds. Therefore, it has a very good structure for implementing adaptive modulation and coding (AMC).

In order to actually operate HARQ with the structure of the upper layer and the physical layer of FIGS. 1 and 2, a retransmission protocol of a transmitter for a retransmission request (i.e., NAK transmitted from a receiver) is required. For this, the 3GPP2 CDMA2000 1x EV-DV system uses Asynchronous and Adaptive Increment Redundancy (AAIR), and this will be described below.

A base station asynchronously performs packet transmission to a corresponding mobile station according to the quality of a forward channel. At this point, a modulation scheme and a code rate of the transmission packet are adaptively applied according to a channel condition. In addition, a packet transmission failure during initial transmission is retransmitted, and during retransmission, a code symbol pattern that is different from that at the initial transmission can be transmitted. Such an AAIR retransmission scheme increases a signal-to-noise ratio (SNR) of packet data due to an increase in the number of retransmissions, and increases a coding gain due to a decrease in a code rate, thereby improving transmission/reception performance of packet data.

A channel used for transmission of forward packet data in the 1x EV-DV system includes a forward packet data channel (F-PDCH) for payload traffic and a forward packet data control channel (F-PDCCH) for controlling the F-PDCH. F-PDCH is a channel for transmitting an encoder packet (EP) which is a transmission data block, and a maximum of up to 2 channels are used to simultaneously transmit their encoder packets to 2 mobile stations by time division multiplexing (TDM)/code division muitiplexing (CDM). An encoder packet is encoded by a turbo encoder, and then some of the encoded symbols are selected as a subpacket having specific Increment Redundancy (IR) pattern by OCTC symbol selection. The subpacket is a transmission unit for initial transmission and retransmission, and at each transmission, an IR pattern of a subpacket is identified by a subpacket identifier (SPID). A modulation scheme (QPSK, 8PSK or 16QAM) and a transmission slot length (1, 2 or 4 slots) of the subpacket are determined according to forward channel quality information transmitted from a mobile station and resources (the number of Walsh codes and power assignable to F-PDCH) of a base station.

Information related to demodulation and decoding of F-PDCH is multiplexed with F-PDCH through other orthogonal channels for the same slot period, and then transmitted over the F-PDCCH which is a control channel. Information included in the F-PDCCH is very important for performing a physical layer's HARQ operation by a mobile station, and requires the following:

1) fragmented Walsh code information available for F-PDCH every several tens to several hundreds milliseconds;
2) MAC_ID: MAC_ID of a mobile station (MS) to which F-PDCH is assigned;
3) ACID: ID for identifying 4 ARQ channels (ARQ channel ID);
4) SPID: ID for identifying an IR pattern of a subpacket;
5) EP_NEW: information for distinguishing two consecutive encoder packets in the same ARQ channel;
6) EP_SIZE: a bit size of an encoder packet; and
7) LWCI (Last Walsh Code Index): information on a Walsh code used for F-PDCH.

Meanwhile, packet data reception in a mobile station is performed from decoding of F-PDCCH. A mobile station first decodes F-PDCCH to determine whether its own packet is being transmitted, and if it is determined that the transmitted packet is its own packet, the mobile station performs demodulation and decoding on F-PDCH. If a currently received subpacket is a subpacket that was retransmitted for a previously received encoder packet, the mobile station performs decoding after code-combining the currently received subpacket with code symbols of an encoder packet that was previously received and stored therein. If the decoding is successful, the mobile station transmits an ACK signal over a reverse ACK/NAK transmission channel (R-ACKCH), allowing the base station to transmit a subpacket for the next encoder packet. If the decoding is not successful, the mobile station transmits a NAK signal, requesting the base station to transmit a subpacket for the same encoder packet.

A unit for which a physical layer's HARQ operation is performed on one encoder packet is called an "ARQ channel." In the CDMA2000 1x EV-DV system, a maximum of 4 ARQ channels can simultaneously operate, and these are called "N=4 fast HARQ channels."

In the 1x EV-DV standard, it is provided that ACK/NAK Delay necessary for performing by a mobile station a packet reception operation and transmitting ACK/NAK and the number of simultaneously available ARQ channels should be provided to a base station by the mobile station, and this becomes an implementation issue for a mobile station. Therefore, a possible ACK/NAK Delay supported by the mobile station is 1 slot (=1.25 msec) or 2 slots (2.5 msec), and the possible number of ARQ channels is 2, 3 or 4. With reference to FIGS. 3 and 4, a description will now be made of an operation depending on ACK/NAK Delay and the number of ARQ channels.

FIG. 3 is a timing diagram between a base station and a mobile station for ACK/NAK Delay=1 slot in HARQ in a mobile communication system, and FIG. 4 is a timing diagram between a base station and a mobile station for ACK/NAK Delay=2 slots in HARQ in a mobile communication system.

It will be assumed in FIGS. 3 and 4 that a forward packet data channel (F-PDCH) is assigned to a mobile station A. In addition, for the convenience of explanation, indexes are sequentially assigned to time slots of both a base station (BS) and a mobile station (MS) from $0^{th}$ time slot beginning at a particular time. Further, in FIGS. 3 and 4, A(x,y) has the following meaning. Hatched parts refers to data to be transmitted to the mobile station A. In addition, 'x' refers to an ARQ channel, and 'y' refers to an index for distinguishing an IR pattern for the same encoder packet. Based on this, a description will now be made of FIG. 3 in which ACK/NAK Delay is 1 slot.

Referring to FIG. 3, data from a base station is transmitted to a mobile station A at a $0^{th}$ slot. Then, the mobile station A receives the packet data at the same slot. In FIGS. 3 and 4, the base station and the mobile station have different slot start points due to transmission delay occurring between the mobile station and the base station on the basis of an absolute time. At this point, the base station transmits packet data and a packet data control signal over a forward packet data channel (F-PDCH) and a forward packet data control channel (F-PDCCH), respectively. Then, the mobile station A determines whether the data has an error, for a one-slot processing time, and thereafter, transmits ACK or NAK to the base station. The "processing time" refers to a time required for performing demodulation and decoding on received packet data for one slot, and transmitting the result at the next slot over a reverse channel (R-ACKCH). For example, in FIG. 3, NAK is transmitted. The base station then receives the NAK at a $3^{rd}$ slot, and schedules retransmission of the defective data at a $4^{th}$ slot. Thereafter, the base station transmits data of a different pattern for the same encoder packet according to the scheduling result.

Next, a description will be made of FIG. 4 in which ACK/NAK Delay is 2 slots. It will be assumed in FIG. 4 that an error has occurred in a first data packet among the data packets transmitted from a base station to a mobile station A, and the description will be focused on the first data packet. Since the delay time is 2 slots, the base station continuously transmits packet data to the mobile station A at a $0^{th}$ slot, a $1^{st}$ slot and a $2^{nd}$ slot. The mobile station then checks an error of the data transmitted at the $0^{th}$ slot for a period of the $1^{st}$ to the $2^{nd}$ slots, checks an error of the data transmitted at the $1^{st}$ slot for a period of the $2^{nd}$ to $3^{rd}$ slots, and checks an error of the data transmitted at the $2^{nd}$ slot for a period of the $3^{rd}$ to $4^{th}$ slots. ACK/NAK for the data received at the $3^{rd}$ slot, ACK/NAK for the data received at the $1^{st}$ slot is transmitted at the $4^{th}$ slot, and ACK/NAK for the data received at the $2^{nd}$ slot is transmitted at a $5^{th}$ slot. If the base station receives, at the $4^{th}$ slot, NAK for the packet data transmitted at the $0^{th}$ slot, the base station performs, at the next slot, retransmission on an encoder packet transmitted at the $0^{th}$ slot. The retransmitted packet data is the same packet as the previously transmitted packet but has a different IR pattern.

As can be understood from FIGS. 3 and 4, the mobile station performs synchronous ACK/NAK transmission in which the mobile station must transmit ACK or NAK for a received packet after a lapse of 1 slot or 2 slots. The base station performs asynchronous ACK/NAK transmission in which the base station can transmit a packet at any slot after receiving ACK/NAK for a packet previously transmitted by the mobile station for the same ARQ channel.

In addition, FIGS. 3 and 4 illustrate a 1-channel ARQ operation and a 4-channel ARQ operation, respectively. In the 1-channel ARQ operation of FIG. 3, data transmission to one mobile station uses only a part of base station resources, decreasing a packet data rate of a corresponding mobile station. In contrast, in the 4-channel ARQ operation of FIG. 4, one mobile station can use the entire resources of the base station, so a corresponding mobile station can obtain a maximum packet data rate.

As described above, it is possible to enable fast ARQ response and processing by moving ARQ control that was achieved in the conventional upper layer, under a multiplexing layer. However, this is a mere logical resolution in the standard, and the following problems arise in its actual implementation.

First, currently, most systems implement an upper layer including a multiplexing layer by software loaded in a central processing unit (CPU). However, in the case of a mobile station, its CPU does not have high processing speed and capability. Therefore, in implementing an HARQ protocol requiring a fast response in the CPU, overload may occur in a clock of the CPU. As a result, the mobile station may fail to perform its normal operation. Particularly, such a problem serves as a big hindrance to implementation, when power consumption of the mobile station is an implementation limitation factor of the system.

Second, transmission interrupt of coded data and a processing delay due to the interrupt, which impose an overload to the CPU, must be reduced to process high-speed transmission data. Therefore, consideration should be taken for a method for reducing data processing interrupts which may occur every 1.25 msec.

Third, in order to support N-channel HARQ, N independent HARQ controllers are required. Therefore, if N is increased, the number of HARQ controllers is also increased, causing an increase in power consumption and complexity. Thus, in implementation, the number of HARQ controllers must be minimized.

Fourth, in order to support N-channel HARQ, N independent turbo decoders are required. Therefore, if N is increased, the number of turbo decoders is also increased, causing an increase in power consumption and complexity. Thus, in implementation, the number of turbo decoders must be minimized.

Fifth, in the standard, ACK_DELAY=1 slot and ACK_DELAY=2 slots described in conjunction with FIGS. 3 and 4 are exclusive options. However, in implementing a mobile station, a structure for varying an operating clock of the mobile station by selectively demultiplying/multiplying the operating clock for low power consumption is considered, so a mobile station's structure capable of applying all ACK_DELAYs in one mobile station must be designed.

Sixth, unlike the conventional data traffic, an encoder packet which is a data block transmitted over a forward packet data channel (F-PDCH) can change its transmission scheme every 1.25 msec. Therefore, a new structure for transmitting, every 1.25 msec, channel structure information that is transmitted once during setup of a data channel is required.

Finally, the other control information necessary for application of a mobile station is transmitted by a base station over a forward packet data control channel (F-PDCCH) which is a traffic control channel. Therefore, the mobile station must efficiently perform an operation of detecting the control information and delivering the detected control information to the upper layer within a short time.

SUMMARY OF THE INVENTION

It is, therefore, an object of the present invention to provide an apparatus and method for resolving the problems of the conventional technology.

It is another object of the present invention to provide an apparatus and method for reducing a load of a CPU.

It is further another object of the present invention to provide an apparatus and method for reducing power consumption of a mobile station in an HARQ control apparatus.

It is yet another object of the present invention to provide an apparatus and method for reducing a load of a CPU caused by a maximum driving clock in an HARQ control apparatus.

It is still another object of the present invention to provide an apparatus and method for reducing a data processing time in an HARQ control apparatus.

It is still another object of the present invention to provide a simple control apparatus and method which is not dependent on the number of channels when N-channel HARQ is supported in an HARQ control apparatus.

It is still another object of the present invention to provide a control apparatus and method for preventing complexity from being increased according to the number of channels in an HARQ control apparatus.

It is still another object of the present invention to provide an apparatus and method for processing all received packets regardless of the number of channels, using a small number of turbo decoders.

It is still another object of the present invention to provide an apparatus and method capable of supporting both ACK_DELAY=1 slot and ACK_DELAY=2 slots.

It is still another object of the present invention to provide an apparatus and method for controlling calculation and setting of control channel parameters generated every slot after initial setup of a packet data channel (PDCH).

It is still another object of the present invention to provide an apparatus and method for calculating and modifying parameters for demodulation and decoding of a traffic channel in a mobile communication system.

It is still another object of the present invention to provide an apparatus and method for rapidly delivering control information of a traffic control channel to an upper layer.

To substantially achieve the above and other objects, there is provided an apparatus for decoding a control message received over a packet data control channel, demodulating and decoding packet data according to a decoding result of the packet data control channel, generating a decoding result as a response signal, and transmitting the response signal, in a mobile communication system that simultaneously transmits a control message over the packet data control channel and packet data over a packet data channel and supports hybrid automatic repeat request (HARQ). The apparatus comprises a physical layer including a decoder for decoding a control message received over the packet data control channel, a demodulator for demodulating packet data received over the packet data channel, and a turbo decoder for decoding the demodulated packet data; and a physical layer's HARQ controller for determining whether to demodulate and decode the received packet data depending on a decoding result of the control message, outputting the decoded control message to the demodulator and the turbo decoder during demodulation and decoding of the received packet data, controlling output of a response signal according to a decoding result of the packet data, and delivering the turbo-decoded packet data to an upper layer.

The physical layer's HARQ controller comprises an HARQ state machine for controlling state transition of an initial state for initializing parameters while waiting for a control message to be received over the packet data control channel received from the physical layer, a decoding state for decoding the control message, a control state for calculating the decoding result, a demodulation state for demodulating packet data on the packet data channel, a decoding state for turbo decoding the demodulated packet data, and a response state for transmitting the turbo-decoding result; and a state function section for controlling state transition of the HARQ state machine depending on a processing result of the physical layer.

Further, the apparatus comprises a data path processor for controlling a processing path of data received over the packet data channel.

Further, the apparatus comprises an output buffer controller for controlling an output buffer of the physical layer, which stores data obtained by demodulating and decoding data received over the packet data channel.

Preferably, the HARQ state machine is dualized.

If a response delay time comprises 2 slots, each of the dualized HARQ state machines alternately controls the state transition for 2 slots for the data received over the packet data channel.

If a response delay time comprises 2 slots, the HARQ state machine controls transition to a waiting state for waiting for turbo decoding by a turbo decoder of the physical layer to be done when the turbo decoder is in operation.

The state function section comprises first state processors for performing control operations of the associated dualized HARQ state machines in the initial state; a second state processor for performing control operations of the HARQ state machines in the control state; a third state processor for performing control operations of the HARQ state machines in the demodulation state; a fourth state processor for performing control operations of the HARQ state machines in the waiting state; a fifth state processor for performing control operations of the HARQ state machines in the decoding state; and sixths state processors for performing control operations of the associated HARQ state machines in the response state.

The physical layer comprises one data channel turbo decoder.

To substantially achieve the above and other objects, there is provided a method for controlling an operation of receiving packet data and a control message in a physical layer for decoding a control message received over a packet data control channel, demodulating and decoding packet data according to a decoding result of the packet data control channel, generating a decoding result as a response signal and transmitting the response signal, and a hybrid automatic repeat request (HARQ) controller included in the physical layer, in a mobile communication system that simultaneously transmits a control message over the packet data control channel and packet data over a packet data channel and supports hybrid automatic repeat request. The method comprises the steps of: (a) initializing parameters of the HARQ controller in the physical layer during initial drive, and upon receiving the control message, controlling decoding of the received control message; (b) calculating a parameter of the control message according to a decoding result of the packet data control channel, and performing a fast HARQ protocol; (c) controlling demodulation of packet data received over the packet data channel according to the calculated parameter; (d) controlling turbo decoding of the demodulated data according to the calculated parameter; and (e) transmitting an error check result of the turbo decoded data.

Further, the method comprises the step of avoiding performing succeeding states and returning to the step (a), if the calculated parameter comprises a non-creatable parameter.

Further, the method comprises the steps of determining whether the parameter is a message for control hold mode/cell switching, if the calculated parameter is a non-creatable parameter; and delivering the message to the upper layer, if the parameter is a message for control hold mode/cell switching.

Further, the method comprises the step of transitioning to an initial state if the parameter is not a message for control hold mode/cell switching.

Further, the method comprises the step of waiting until use of a data channel turbo decoder is ended and then proceeding to the step (d), if the data channel turbo decoder of the physical layer is in use.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
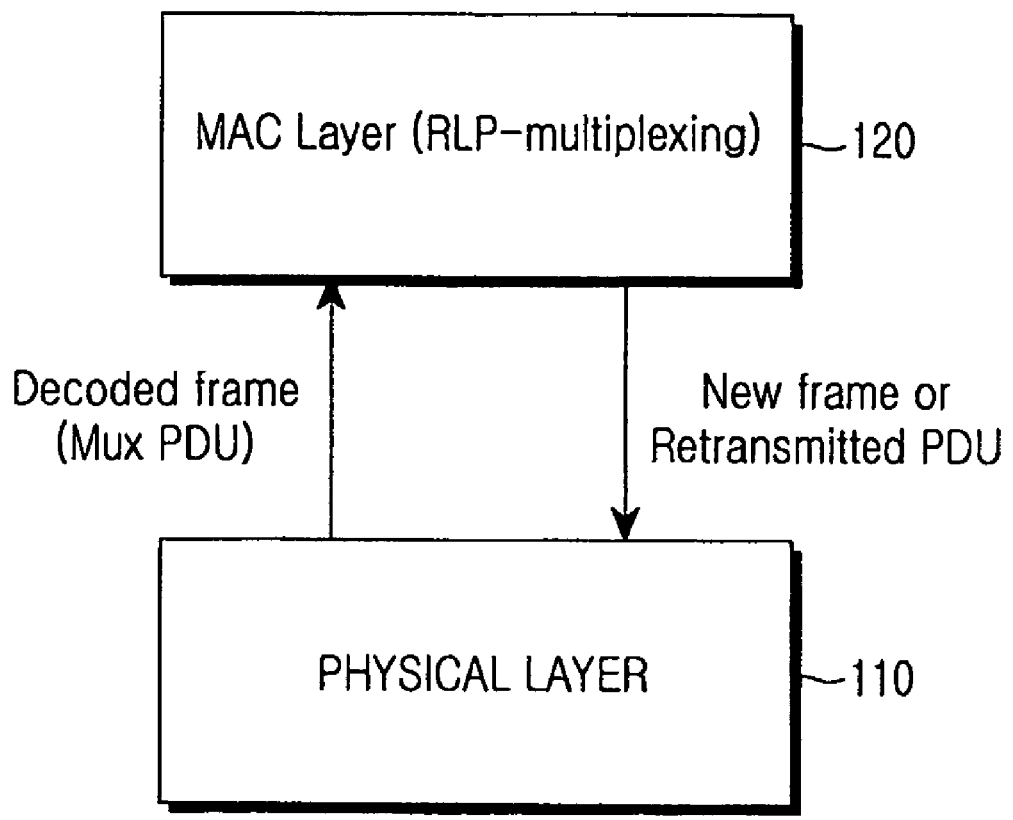
FIG. 1 is a block diagram illustrating a relation between an upper layer and a physical layer for Automatic Repeat Request (ARQ) processing according to the prior art.
Figure 2:
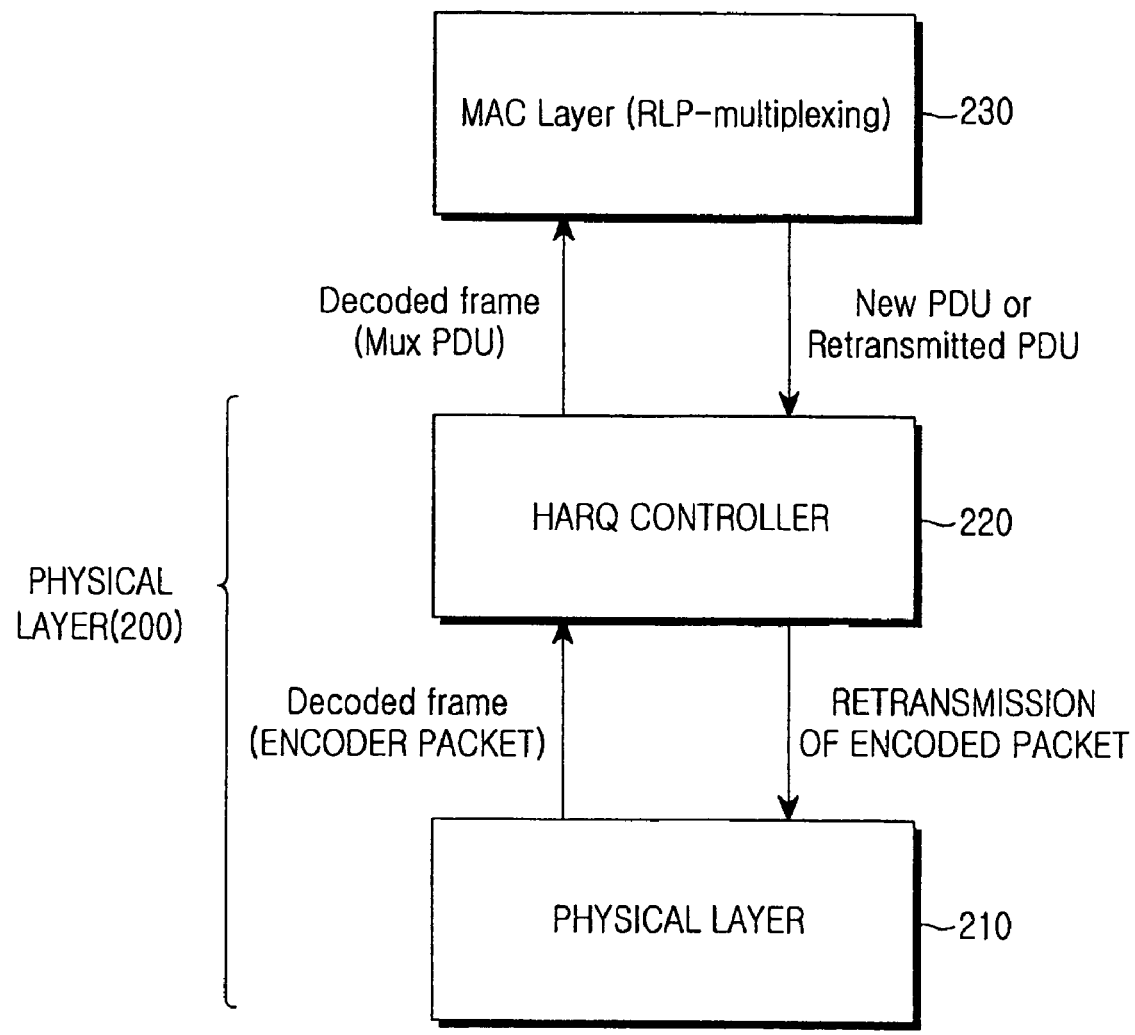
FIG. 2 is a block diagram illustrating a relationship between an upper layer and a physical layer for improved fast (physical) Hybrid Automatic Repeat Request (HARQ) processing.
Figure 3:
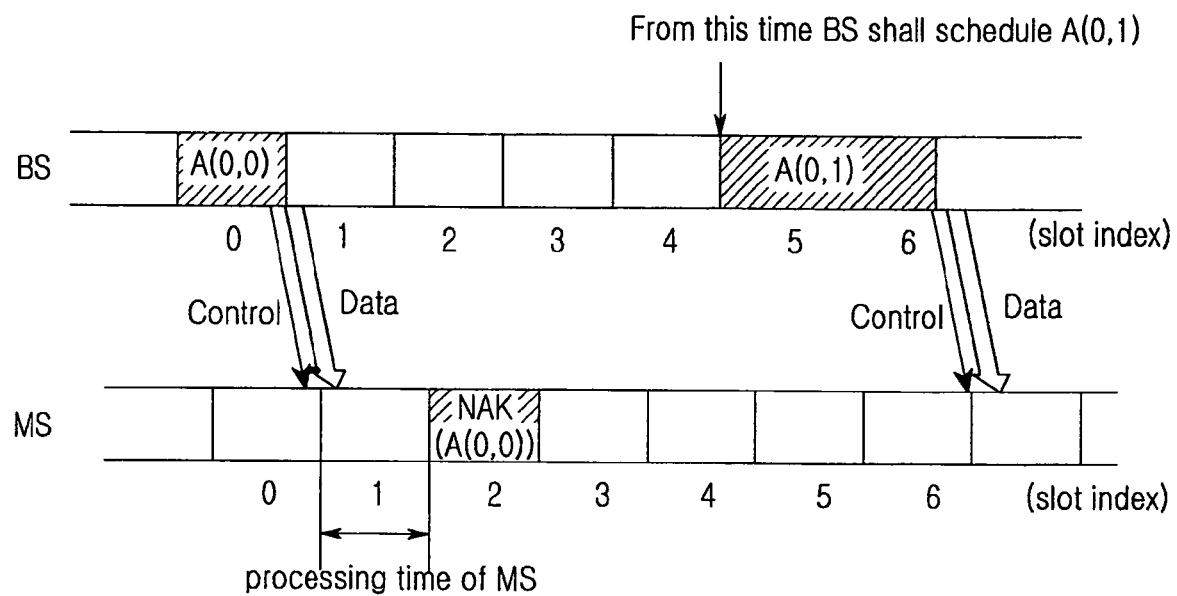
FIG. 3 is a timing diagram illustrating a relationship between a base station and a mobile station for ACK/NAK Delay=1 slot in HARQ in a mobile communication system.
Figure 4:
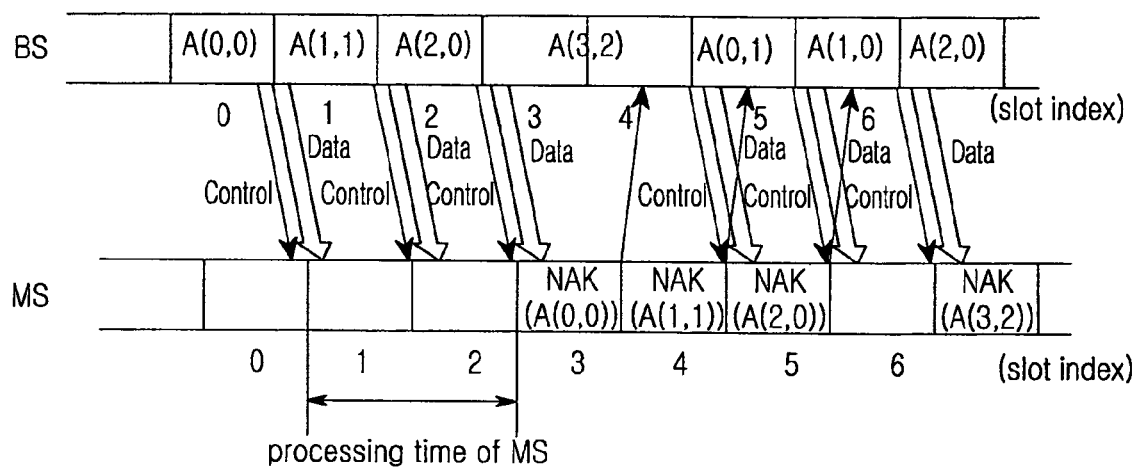
FIG. 4 is a timing diagram illustrating a relationship between a base station and a mobile station for ACK/NAK Delay=2 slots in HARQ in a mobile communication system.

An embodiment of the present invention will now be described in detail with reference to the accompanying drawings. In the drawings, the same or similar elements are denoted by the same reference numerals even though they are depicted in different drawings. In the following description, a detailed description of known functions and configurations incorporated herein has been omitted for conciseness.

An apparatus and method of the present invention for resolving the foregoing problems will now be described.

First, most systems implement an upper layer including a multiplexing layer by software loaded in a central processing unit (CPU). Therefore, the present invention proposes a method for implementing an Hybrid Automatic Repeat Request (HARQ) controller of a physical layer by hardware in order to resolve a power consumption problem and a maximum driving clock problem of a mobile station and to reduce overload of the CPU. If it can be implemented by software without affecting its performance because of excellent performance of the CPU or Digital Signal Processor (DSP), a basic structure of the HARQ controller proposed in the embodiment of the invention can be implemented by software. Herein, the present invention will be described under the assumption that the HARQ controller is implemented by hardware.

Second, the present invention enables high-speed data processing by reducing transmission interrupt of coded data and a processing delay due to the interrupt, which impose an overload on the CPU. To this end, an output buffer controller (OBUFC) is separately installed in an HARQ controller. The output buffer controller takes full charge of an operation of transmitting data from a channel decoder to a CPU (or host). Particularly, the output buffer controller has a capability of controlling a storing time of decoded data, previously set at the request of the CPU, and adjusts a transmission time of transmission data so as to satisfy a minimum transmission interrupt interval desired by the CPU.

Third, in order to support N-channel HARQ, N independent fast HARQ controllers are required. However, the embodiment of the present invention proposes a structure capable of always processing all received packets regardless of the number of channels by using 2 HARQ controllers. Therefore, it is possible to prevent an increase in power consumption and complexity irrespective of an increase in number of the channels. To this end, the structure includes two state machines: an odd state machine and an even state machine, and also has a controller for controlling the state machines.

Fourth, in order to support N-channel HARQ, N independent turbo decoders are required. However, the embodiment of the present invention proposes a structure capable of processing all received packets regardless of the number of channels by using one turbo decoder. Therefore, it is possible to decrease power consumption and circuit complexity irrespective of an increase in the number of channels. To this end, the embodiment of the present invention proposes a method in which an HARQ controller adaptively determines/controls a start signal and a stop signal for decoding of the one turbo decoder. Further, in the structure, a "waiting state" is added to each state machine.

Fifth, the embodiment of the present invention implements an HARQ controller that supports both ACK_DELAY=1 slot and ACK_DELAY=2 slots. Since in implementing a mobile station, a structure for varying an operating clock of the mobile station by selectively demultiplying/multiplying the operating clock for low power consumption is considered, so a state machine and a state function of an HARQ controller are provided to support two modes in which all ACK_DELAYs can be applied in one mobile station.

Sixth, unlike the conventional data traffic, an encoder packet which is a data block transmitted over a forward packet data channel (F-PDCH) can change its transmission scheme every 1.25 msec. Therefore, as usual, the CPU takes part in only initial setup so as to deliver, every 1.25 msec, channel structure information that is transmitted once during setup of a data channel. In addition, calculating and setting of control channel parameters generated every slot, and calculation and modification of parameters for demodulation and decoding of a traffic channel are performed in the HARQ controller.

Seventh, control information necessary for application of a mobile station, transmitted by a base station over a forward packet data control channel (F-PDCCH) which is a traffic control channel, is detected and then delivered to an upper layer of the CPU within a short time. In addition, the message detection result is reflected in the state machine and a state function according thereto is defined.

Function of HARQ Controller Upon receiving Evolution Data and Voice (EV-DV) (forward link RC-10) packet data, an HARQ controller controls an operation of each block related to the received packet data. Each block related to reception of the packet data operates under the control of the HARQ controller, and after completion of a corresponding operation, informs the HARQ controller of the completion of the corresponding operation. The HARQ controller performs the next operation using the operation completion information from each block. In addition, the HARQ controller stores input information and internal information from each block in its register. By doing so, the HARQ controller can monitor the progress of an HARQ operation. The control of each block, performed by the HARQ controller, is mainly timing control for performing an HARQ operation within a given time, and does not include control for a unique operation of each block. In addition, the HARQ controller determines whether it will perform a normal mode operation or an abnormal mode operation using reception information and internal information on a forward packet data control channel (F-PDCCH). The HARQ controller performs an operation based on the determination result. The operation in the abnormal mode is caused by an error in a radio channel state, and is for improving data reception performance.

Typical functions of the HARQ controller according to the embodiment of the present invention are as follows:

(1) The HARQ controller determines whether it will operate in a normal mode operation or an abnormal mode operation according to a reception message on F-PDCCH and internal information of the HARQ controller.

(2) The HARQ controller controls a demodulation and turbo decoding operation for F-PDCH according to an operation mode.

(3) The HARQ controller determines information (ACK/NAK or Silence) to be transmitted over an uplink response channel (R-ACKCH).

(4) The HARQ controller generates an interrupt to an upper layer in order to transfer received data to an output buffer of a turbo decoder.

(5) The HARQ controller continuously stores and updates related information every Automatic Repeat Request (ARQ) channel.

(6) The HARQ controller supports a maximum of 4 ARQ channels.

(7) The HARQ controller supports all control operations in the case where ACK/NAK Delay is 1 slot and 2 slots.

Figure 5:
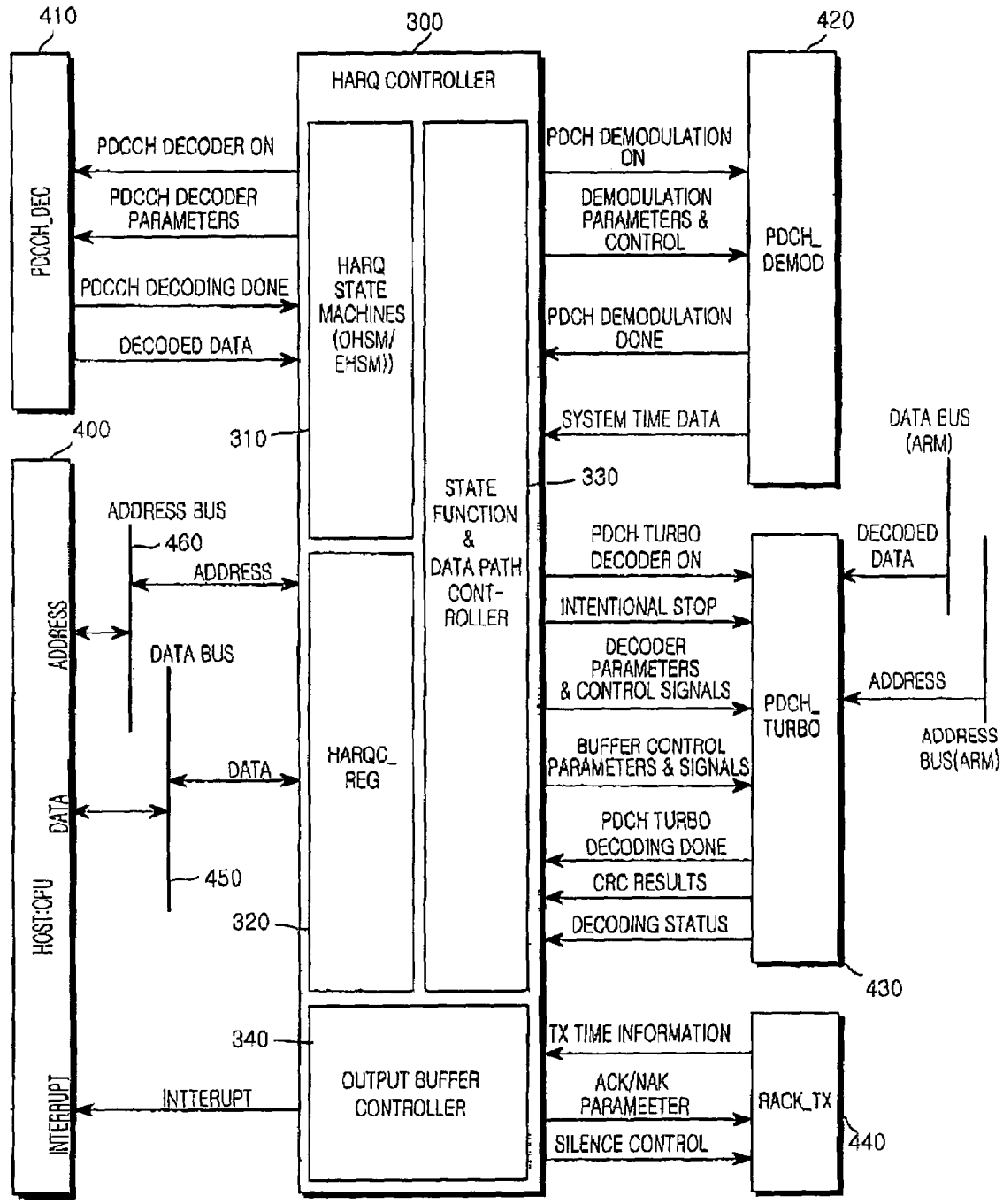
FIG. 5 is a block diagram illustrating an interface between peripheral blocks centering on an HARQ controller according to an embodiment of the present invention.

FIG. 5 is a block diagram illustrating an HARQ controller applied to process an operation of an upper layer by a physical layer and an interface between peripheral blocks centering on the HARQ controller. With reference to FIG. 5, a description will now be made of respective blocks connected to the HARQ controller according to the embodiment of the present invention, and an internal structure and operation of the HARQ controller.

The HARQ controller 300 includes therein 2 HARQ state machines (OHSM/EHSM) 310, an HARQ register (HARQC_REG) 320, a state function and data path controller 330, and an output buffer controller 340. An HARQ operation is controlled by the HARQ state machines 310 and the state function and data path controller 330 among the elements of the HARQ controller 300. An output buffer connected to a data channel turbo decoder 430 which will be described later, is controlled by the output buffer controller 340. Connections of signals input to and output from the HARQ controller 300 are schematically illustrated in FIG. 5. That is, signals output from a particular internal block are not illustrated. Now, with reference to the accompanying drawings, a description will be made of respective internal structures and their connections of the HARQ controller 300 illustrated in FIG. 5.

The HARQ controller 300 is connected to a processor (CPU or host) 400, and can exchange data via a data buss 450 and an address bus 460. Further, the HARQ controller 300 can transmit an interrupt signal to the processor 400 via an interrupt line. The HARQ controller 300 is connected to a control channel decoder (PDCCH_DEC) 410 for decoding data carried on a packet data control channel, controls an On/Off operation of the control channel decoder 410, and provides a decoding parameter for the data carried on the packet data control channel. The control channel decoder 410 for decoding data on the packet data control channel (PDCCH) decodes data on the packet data control channel based on the parameter received from the HARQ controller 300, and then delivers the decoded data to the HARQ controller 300 along with a decoding-done signal.

The HARQ controller 300 is connected to a data channel demodulator (PDCH_DEMOD) 420 for demodulating data carried on a packet data channel, controls an On/Off operation of the data channel demodulator 420, and provides demodulation parameters and control signals to the data channel demodulator 420. The data channel demodulator 420 then demodulates data carried on the packet data channel, delivers the demodulated data to the HARQ controller 300, and provides system time data to the HARQ controller 300.

The embodiment of the present invention provides a controller operating in the EV-DV system. Therefore, data transmitted from the EV-DV system is fundamentally turbo-encoded by a turbo encoder before being transmitted. Therefore, the HARQ controller 300 is connected to a data channel turbo decoder (PDCH_TURBO) 430 for decoding data carried on a packet data channel, and performs an On/Off operation of the data channel turbo decoder 430. In addition, the HARQ controller 300 provides the data channel turbo decoder 430 with an intentional stop signal, turbo decoding parameters and control signals, and buffer control parameters and control signals. The data channel turbo decoder 430 then turbo-decodes data on a packet data channel based on various parameters and control signals received from the HARQ controller 300, and provides the HARQ controller 300 with a turbo decoding-done signal, a CRC result signal, and a decoding status signal. In addition, the data channel turbo decoder 430 is connected to a data bus and an address bus in order to store and read data into/from a memory (not shown). The HARQ controller 300 performs a control operation of delivering data stored in a buffer connected to the turbo decoder 430 to the processor 400.

The HARQ controller 300 is connected to a response signal transmitter (RACK_TX) 440, and performs ACK/NAK and Silence control on the data on a received packet data channel according to its decoding result. In addition, the response signal transmitter 440 outputs transmission timing information to the HARQ controller 300.

Operations and states of the HARQ controller 300 will be described with reference to Table 1 below.

TABLE 1

| State | Description | ACK_DELAY (slot) |
|---|---|---|
| S1 | WAITING_FOR_PDCCH_DEC_DONE<br>A state where the HARQ controller waits for PDCCH_DEC_DONE to be received from PDCCH_DEC. | 1 & 2 |
| S2 | DEMOD_SIG_GEN<br>A state where the HARQ controller calculates parameters for New/Continue Decision of subpacket, Extraction of Signaling message, and PDCH Demodulation. | 1 & 2 |
| S3 | PDCH_DEMOD<br>A state where the HARQ controller performs PDCH Demodulation. | 1 & 2 |
| S4 | WAITING_FOR_TURBO_DE-CODER_TO_USE<br>A state where the HARQ controller waits for TURBO decoder to use. | 2 |
| S5 | TURBO_DECODING<br>A state where the HARQ controller delivers decoding start signal and necessary parameters to PDCH Turbo decoder and waits for decoding to be done. | 1 & 2 |
| S6 | ACK_NAK_TRANSMISSION<br>A state where the HARQ controller transmits ACK/NAK over Reverse channel after PDCH Turbo decoding is done. | 1 & 2 |

In Table 1, respective states S1, S2, S3, S4, S5 and S6 represent states defined in order of an operation performed at a particular time in the HARQ controller 300 and a next operation performed thereafter. The respective states S1, S2, S3, S4, S5 and S6 have a mutual relationship between a previous operation and a next operation. In addition, Table 1 illustrates states necessary for when ACK/NAK Delay is 1 slot, and states necessary for when ACK/NAK Delay is 2 slots. For example, the fourth state S4 represents a state necessary only when ACK/NAK Delay is 2 slots. The respective states of Table 1 will now be described herein below.

The first state S1 is an 'initial state' that is performed when a packet data control channel message being matched to MACID in control data carried on a packet data control channel (PDCCH) is received or a predetermined control message to be transmitted from a base station to a mobile station is received. When the HARQ controller 300 enters the first state S1, it waits for decoding of control data carried on a packet data control channel to be completed. That is because the data channel demodulator 420 can demodulate data on a packet data channel using control data on a packet data control channel. In addition, the HARQ controller 300 performs a register initialization operation in the first state S1, and then transitions to the second state S2 when decoding of the packet data control channel is completed.

In the second state S2, the HARQ controller 300 calculates parameters for demodulation of a packet data channel using various messages received as the decoding result of the first state S1. The second state S2 becomes an 'HARQ control state'. Further, in the second state S2, the HARQ controller 300 processes an HARQ protocol in the physical layer. That is, in the second state S2, the HARQ controller 300 calculates a modulation level necessary for demodulation and the number of Walsh code channels, and delivers the results to the data channel demodulator 420. In addition, the HARQ controller 300 determines in the second state S2 whether a subpacket received in the first state S1 over a packet data channel according to ACID and EP_NEW which are decoding results of a packet data control channel is new data (initial transmission data) or retransmitted data. Further, when an upper layer control message (or signaling message) is detected according to the decoding result of the packet data control channel, the HARQ controller 300 directly determines ACK/NAK transmission, disregarding another process. Besides, the HARQ controller 300 performs invalidity test in the second state S2, and if it is determined that a message that the base station cannot transmit is received, the HARQ controller 300 returns to the first state S1 which is an initial state.

In the third state S3, the HARQ controller 300 controls the data channel demodulator 420 to demodulate data carried on a packet data control channel. The third state S3 is a 'demodulation state'. In this demodulation state, a parameter for demodulation of the detection result on initial transmission data or retransmission data detected in the second state S2 is provided to the data channel demodulator 420 to demodulate a subpacket carried on a packet data channel. Therefore, the HARQ controller 300 provides parameters necessary for demodulation to the data channel demodulator 420, and then waits until demodulation is completed. If the demodulation is completed, the HARQ controller 300 transitions to the fourth state S4 or the fifth state S5 according to the number of slots for ACK/NAK Delay.

In a specific case, the HARQ controller 300 transitions to the fourth state S4. The fourth state S4 is a 'waiting state' where the HARQ controller 300 waits while a subpacket received over a previous packet data channel is demodulated by an HARQ state machines 310 included in the HARQ controller 300. Such a control state needs to be held only when ACK/NAK Delay is 2 slots because the data channel turbo decoder 430 must decode new data every slot only when ACK/NAK Delay is 1 slot. However, when ACK/NAK Delay is 2 slots, the data channel turbo decoder 430 may be in the process of decoding data received at a previous slot. In this case, the HARQ controller 300 must wait until an operation of the data channel turbo decoder 430 is completed. Furthermore, since only one data channel turbo decoder 430 is used in embodiment of the present invention, this state is necessarily required when the ACK/NAK Delay is 2 slots, in order to prevent data collision. That is, by employing the fourth state S4, it is possible to process a plurality of packet data channels using one turbo decoder even when ACK/NAK Delay is 2 slots. The HARQ controller 300 transitions to the fifth state S5, if the data channel turbo decoder 430 becomes available while the HARQ controller 300 is waiting in the fourth state S4.

In the fifth state S5, the HARQ controller 300 controls turbo decoding. The fifth state S5 becomes a 'decoding state'. That is, in the fifth state S5, the HARQ controller 300 provides various information necessary for turbo decoding to the data channel turbo decoder 430. The information necessary for turbo decoding can become a size of an encoder packet (EP) and ACID. The HARQ controller 300 provides the above information to the data channel turbo decoder 430 and thereafter, waits until a decoding operation is done. However, there is a case where turbo decoding is performed for an excessively long time, or turbo decoding must be performed early by other information. In this case, the HARQ controller 300 can compulsorily stop turbo decoding by outputting an intentional stop signal. The HARQ controller 300 transitions to the sixth state S6, when the turbo decoding is completed or intentionally ended.

In the sixth state S6, the HARQ controller 300 transmits a response signal (ACK/NAK) for a subpacket received over a reverse channel according to the decoding result of the data channel turbo decoder 430. That is, the sixth state S6 is a 'response signal (ACK/NAK) transmission state'. Therefore, the HARQ controller 300 controls the response signal transmitter 440, and as a result of the decoding, if there is no error, the HARQ controller 300 transmits ACK over a reverse channel. In contrast, if an error has occurred, the HARQ controller 300 transmits NAK over a reverse channel. Since the sixth state S6 is the last state of the HARQ controller 300, the HARQ controller 300 transitions to the first state S1 after transmitting the decoding result, and waits again in the initial state to process the next state. When ACK/NAK Delay is 2 slots, the HARQ controller 300 includes two HARQ state machines 310. In this case, the two HARQ state machines 310 can simultaneously perform the first state S1 or the sixth state S6. However, the other states S2, S3, S4 and S5 are never used simultaneously.

Figure 6:
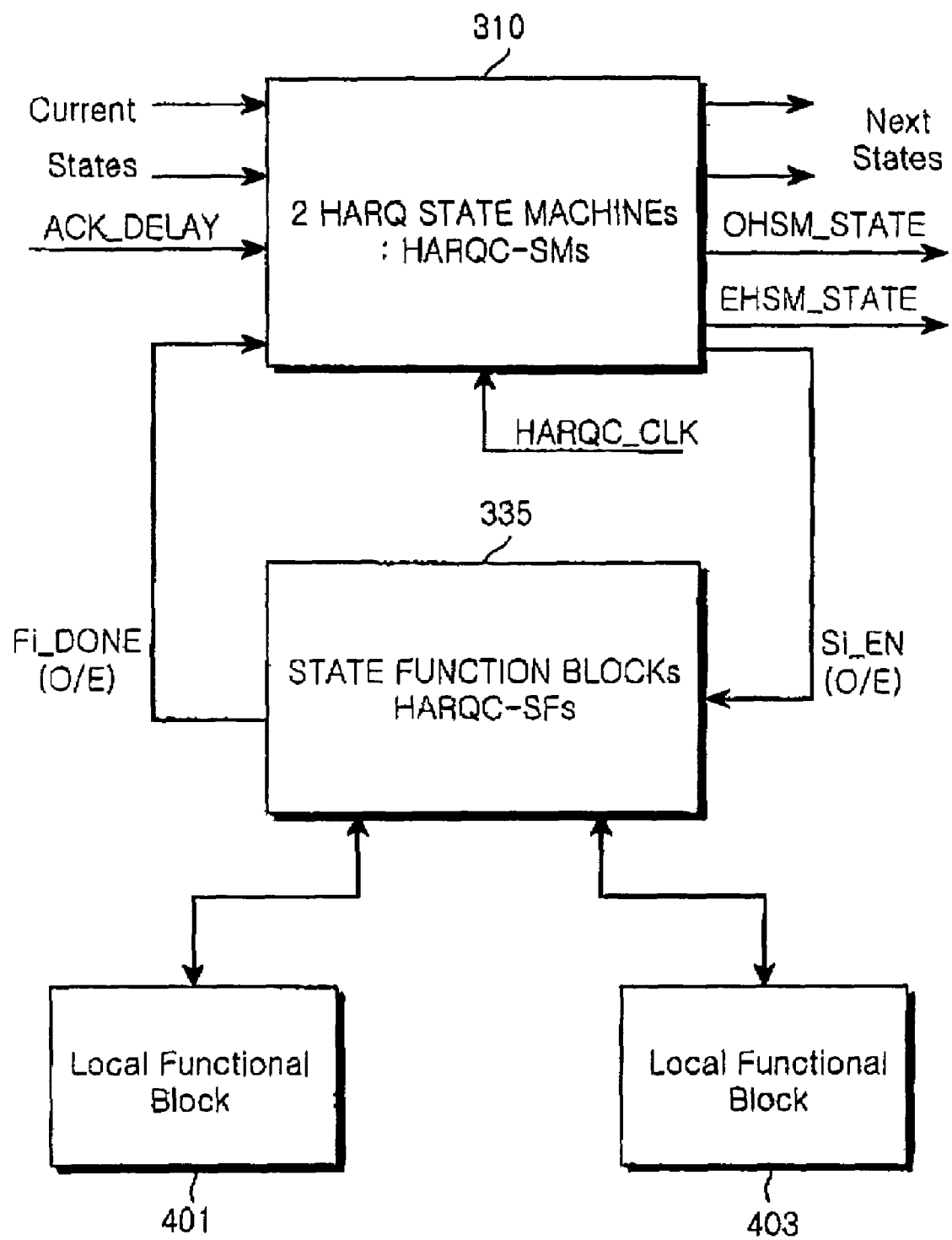
FIG. 6 is a block diagram illustrating the connection between an HARQ state machine and a state function section in an HARQ controller according to an embodiment of the present invention.

Next, an internal structure of the HARQ controller 300 will be described below. FIG. 6 is a diagram illustrating the connection between an HARQ state machine and a state function section in an HARQ controller according to an embodiment of the present invention. With reference to FIG. 6, a detailed description will be made of the connection between an HARQ state machine and a state function section according to an embodiment of the present invention.

In FIG. 6, a state function section 335 represents a state function section separated from the state function and data path controller 330 of FIG. 5. The HARQ state machines 310 control state transition of the first to sixth states S1 to S6 according to an HARQ control flow. That is, the HARQ state machines 310 output state transition signals. The state function section 335 controls other blocks (local function blocks) 401, ..., 403 to control operations performed in the respective states. The other blocks 401, ..., 403 illustrated in FIG. 6 can include the processor 400 and the control channel decoder 410 to the response signal transmitter 440 of FIG. 5, excluding the HARQ controller 300, and can also include other blocks which are not illustrated in FIG. 5. That is, the state function section 335 receives state signals output from the HARQ state machines 310, and control operations depending on the state signal.

The HARQ state machines 310 receive information on current states and information on whether ACK/NAK Delay is 1 slot or 2 slots, and also receives an operation-done signal Fi_DONE from the state function section 335. Since two HARQ state machines 310 are provided when ACK/NAK Delay is 2 slots, the operation-done signal is applied to the respective HARQ state machines 310. Upon receiving the operation-done signal, the HARQ state machines 310 output next state signals. At this point, since two HARQ state machines 310 are provided when ACK/NAK Delay is 2 slots, the respective HARQ state machines 310 output corresponding state information. In addition, the HARQ state machines 310 output a state enable signal Si_EN to the state function section 335 so as to perform a control operation according to the state information and the corresponding state.

That is, the HARQ state machines 310 are different in their number and operation according to whether ACK/NAK Delay is 1 slot or 2 slots. Herein, a detailed description of the embodiment of the present invention will be made with reference to when the number of the HARQ state machines 310 is 1 or 2.

When ACK/NAK Delay is 1 slot, one HARQ state machine 310 is provided, so only one state enable signal is output to the state function section 335. Also, only one operation-done signal is provided from the state function section 335 to the HARQ state machine 310. However, when ACK/NAK Delay is 2 slots, two HARQ state machines 310 are provided. In this case, HARQ state machines 310 are divided into a first HARQ state machine (or odd HARQ state machine (OHSM)) and a second HARQ state machine (or even HARQ state machine (EHSM)). The first and second HARQ state machines have the same structure, and compared with when one HARQ state machine is provided, the fourth state S4 is further provided as illustrated in Table 1. That is, the first and second HARQ state machines perform the same operation in which they generate the same outputs in response to the same inputs. However, this does not mean that the two HARQ state machines are identical in state progress. That is, OHSM and EHSM used are changed according to ACK/NAK Delay as illustrated in Table 2 below.

TABLE 2

| ACK_DELAY (slots) | # of State Machine to use |
|---|---|
| 1 | 1 (OHSM) |
| 2 | 2 (OHSM, EHSM) |

When this is implemented in a mobile station, in order to accept both ACK/NAK Delay=1 slot and ACK/NAK Delay=2 slots, 2 HARQ state machines are provided, and for ACK/NAK Delay=1 slot, only one HARQ state machine is enabled and the fourth state S4 is excluded preferably.

Figure 7:
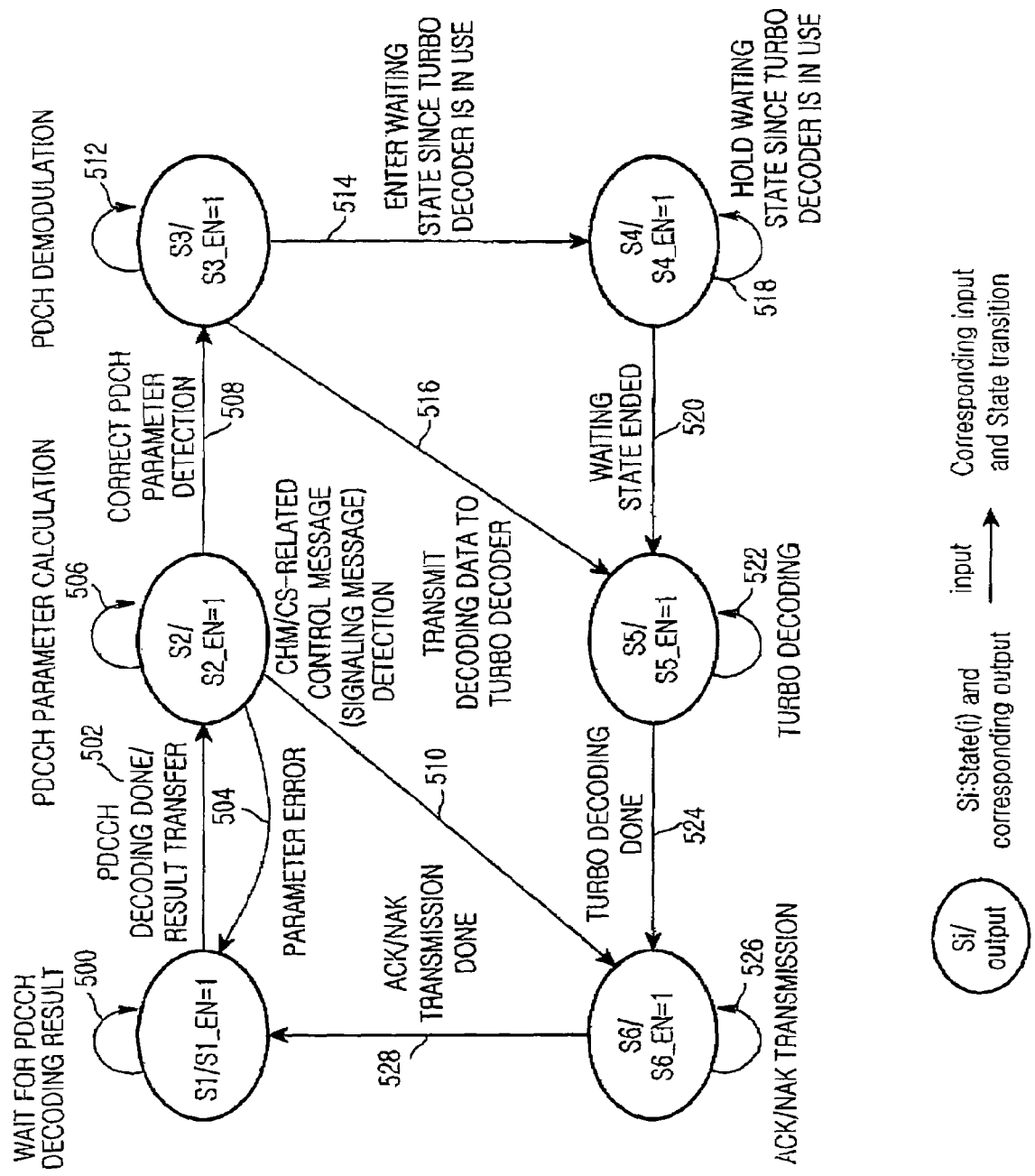
FIG. 7 is a state transition diagram illustrating an HARQ controller according to an embodiment of the present invention.

Now, state transition of the respective states will be described with reference to FIG. 7. FIG. 7 is a state transition diagram of an HARQ controller according to an embodiment of the present invention.

The first state S1 represents a state where the HARQ controller 300 is waiting for decoding of a packet data control channel to be completed after performing initialization on a register, as described in conjunction with Table 1. In FIG. 7, step 500 represents a state where the HARQ controller 300 is waiting while holding the first state S1. If a decoding-done signal of a packet data control channel is received from the state function section 335 while the waiting state is held, transition occurs to the second state S2 in step 502. When transition to the second state S2 occurs, the HARQ state machine 310 calculates in step 506 such parameters as a modulation level necessary for demodulation and a Walsh code, using the decoding result of the packet data control channel in the first state S1. Furthermore, in the second state S2, the calculated parameters are error-checked. As a result of the error check, if a parameter error is detected, the HARQ state machine 310 proceeds to step 504 where it notices occurrence of the parameter error, and then transitions back to the first state S1 (step 500). In contrast, when no error has occurred in the calculated parameters, the HARQ state machine 310 proceeds to step 508 where it detects a correct parameter of a packet data channel, delivers the detected parameter to the state function section 335, and then transitions to the third state S3. As a result of the parameter calculation in step 506, if a received message is a Control Hold Mode/Cell Switching (CHM/CS) related signaling message, the HARQ state machine 310 transitions not to the third state S3 but to the sixth state S6.

If transition to the third state S3 occurs, the HARQ state machine 310 demodulates a packet data channel in step 512. Such demodulation is controlled by the state function section 335, and the HARQ state machine 310 waits for the demodulation to be done. Thereafter, if the demodulation is done, the HARQ state machine 310 performs state transition according to ACK/NAK Delay=1 slot or 2 slots. If ACK/NAK Delay is 1 slot, the HARQ state machine 310 proceeds to step 516 where it transitions to the fifth state S5. If ACK/NAK Delay is 2 slots, the HARQ state machine 310 proceeds to step 514 where it transitions to the fourth state S4. First, a description will be made when ACK/NAK Delay is 2 slots, i.e., where the HARQ state machine 310 proceeds to step 514 and transitions to the fourth state S4.

When transition to the fourth state S4 takes place, the first or second HARQ state machine holds the waiting state since the data channel turbo decoder 430 is being used not by the HARQ state machine itself but by another HARQ state machine, When another HARQ state machine ends use of the data channel turbo decoder 430, the first or second HARQ state machine transitions to the fifth state S5 in step 520.

If transition occurs from the third state S3 or the fourth state S4 to the fifth state S5, the HARQ state machine 310 waits for turbo decoding to be completed in step 522. At this point, the turbo decoding is controlled by the state function section 335. If a turbo decoding-done signal is received from the state function section 335, the HARQ state machine 310 proceeds to step 524 where it transitions to the sixth state S6. The sixth state S6 represents a step in which ACK/NAK is transmitted as described in conjunction with Table 1. If transition to the sixth state S6 takes place, the state function section 335 controls the response signal transmitter 440 to transmit ACK or NAK over a reverse channel according to the turbo decoding result. If transmission of ACK or NAK is done, the state function section 335 outputs an ACK/NAK transmission-done signal to the HARQ state machine 310. As a result, the HARQ state machine 310 proceeds to step 528 where it holds the first state S1.

Figure 8:
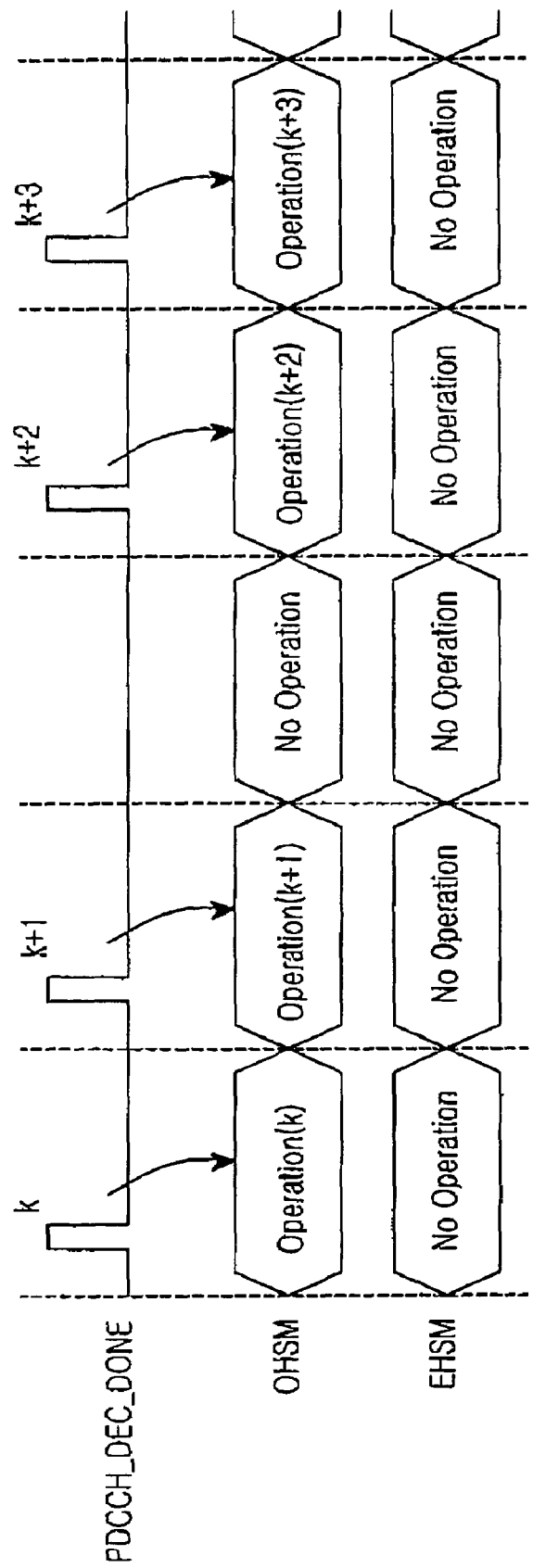
FIG. 8 is an operational timing diagram illustrating first or second HARQ state machines for ACK/NAK Delay=1 slot.

Now, operation timing of the HARQ state machine 310 based on ACK/NAK Delay will be described with reference to the accompanying drawings. FIG. 8 is an operational timing diagram of first or second HARQ state machines for ACK/NAK Delay=1 slot, and FIG. 9 is an operational timing diagram of first and second HARQ state machines for ACK/NAK Delay=2 slots.

Referring to FIG. 8, a description will be made when ACK/NAK Delay is 1 slot. In FIG. 8, if a decoding operation of a $k^{th}$ packet data control channel (PDCCH) is completed, a decoding-done signal is transmitted to the first HARQ state machine OHSM. The first HARQ state machine OHSM then controls state transition in response to a $k^{th}$ signal. If a decoding-done signal of a $(K+1)^{th}$ packet data control channel is received again at the next slot, the first HARQ state machine OHSM controls next state transition in response thereto. That is, when ACK/NAK Delay is 1 slot, the second HARQ state machine EHSM performs no operation.

Figure 9:
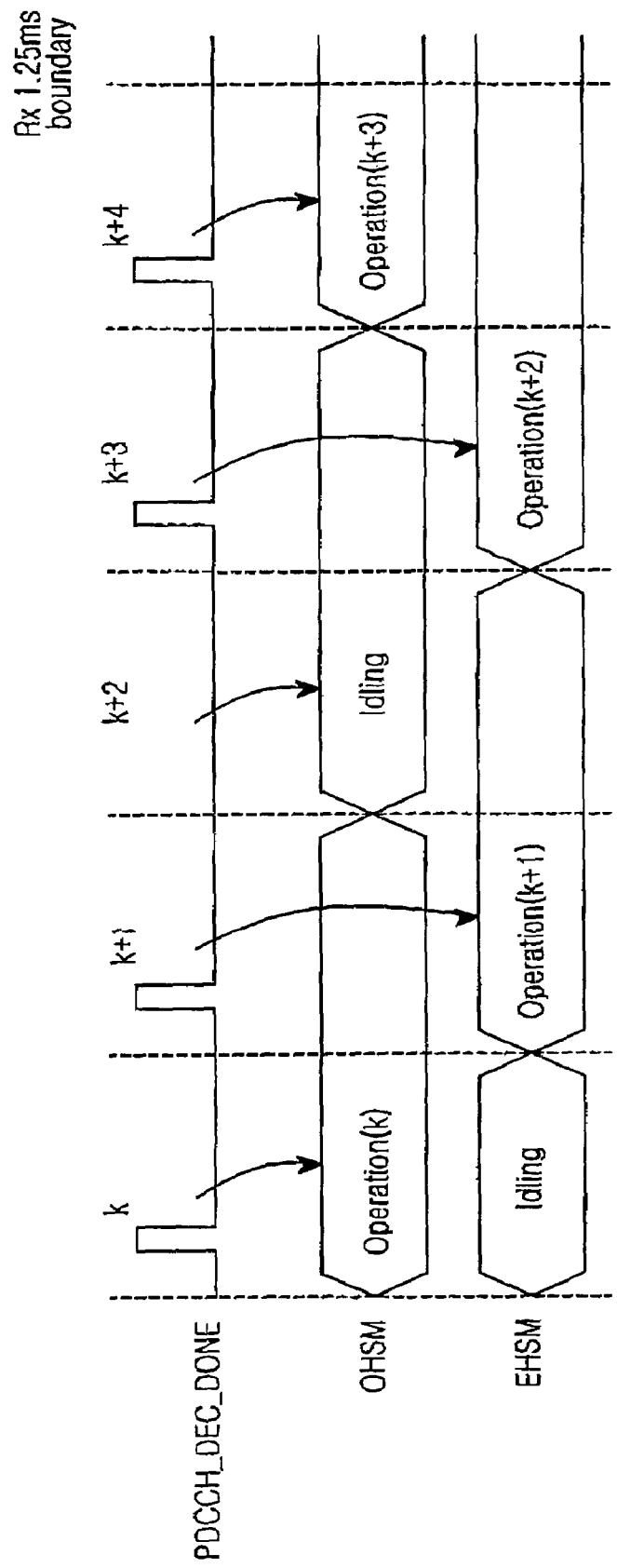
FIG. 9 is an operational timing diagram illustrating first and second HARQ state machines for ACK/NAK Delay=2 slots.

Referring to FIG. 9, a description will be made when ACK/NAK Delay is 2 slots. In FIG. 9, if a decoding operation of a $k^{th}$ packet data control channel (PDCCH) is completed, a decoding-done signal is transmitted to the first HARQ state machine OHSM. The first HARQ state machine OHSM then controls transition of the first to sixth states S1 to S6 for a 2-slot period, i.e., for the $K^{th}$ and $(K+1)^{th}$ slots. In addition, an operation in each state is controlled by the state function section 335 according to a state transition signal from the first HARQ state machine OHSM. If a decoding operation of a $(K+1)^{th}$ packet data control channel (PDCCH) is completed, a decoding-done signal is transmitted to the second HARQ state machine EHSM. Therefore, the second HARQ state machine EHSM controls transition of the first to sixth states S1 to S6 for a 2-slot period, i.e., for the $(K+1)^{th}$ and $(K+2)^{th}$ slots. As illustrated in FIG. 9, if no packet data control channel signal is received at the $(K+2)^{th}$ slot, the first HARQ state machine OHSM holds an idling state. Thereafter, if a packet data control channel signal is received at a $(K+3)^{th}$ slot, the second HARQ state machine EHSM operates. In this order, the first HARQ state machine OHSM and the second HARQ state machine EHSM operate.

In order for the first HARQ state machine OHSM and the second HARQ state machine EHSM to operate with a one-slot offset as illustrated in FIG. 9, a signal for controlling the operation is required. Such a control signal cannot be generated by the HARQ state machine 310 or the state function section 335. Therefore, a separate device is required. At this point, necessary input signals include information on ACK/NAK Delay, a synchronization signal SYNC_125, and a system time clock SYS_TIME_125[0]. If it is determined from the input signals that ACK/NAK Delay is 2 slots, signals ODD_125 and EVEN_125 capable of selecting the first HARQ state machine OHSM or the second HARQ state machine EHSM in synchronism with the synchronization signal and the system time clock are generated.

Figure 10:
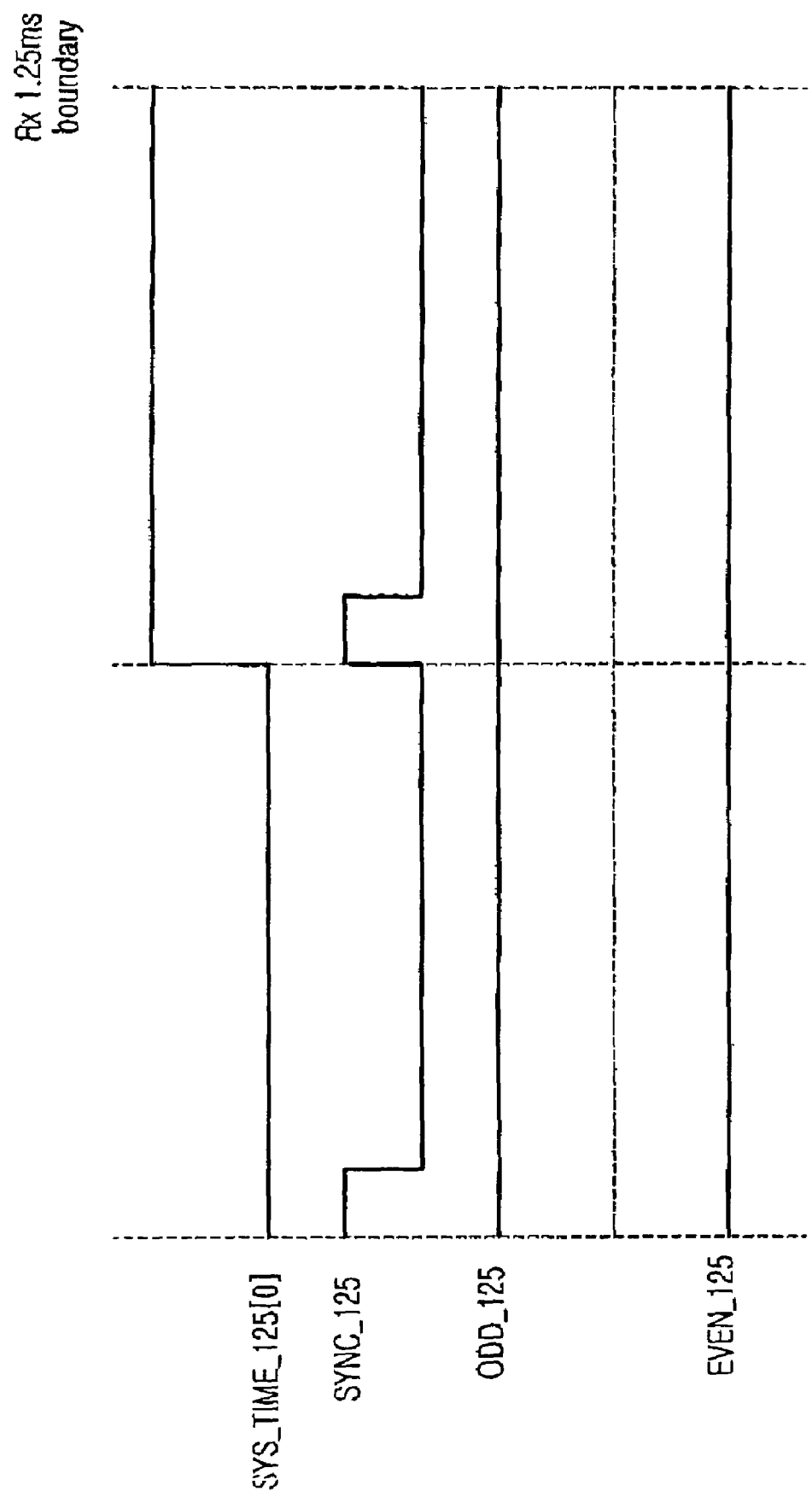
FIG. 10 is an activation control timing diagram illustrating first and second HARQ state machines for ACK/NAK Delay=1 slot according to an embodiment of the present invention.
Figure 11:
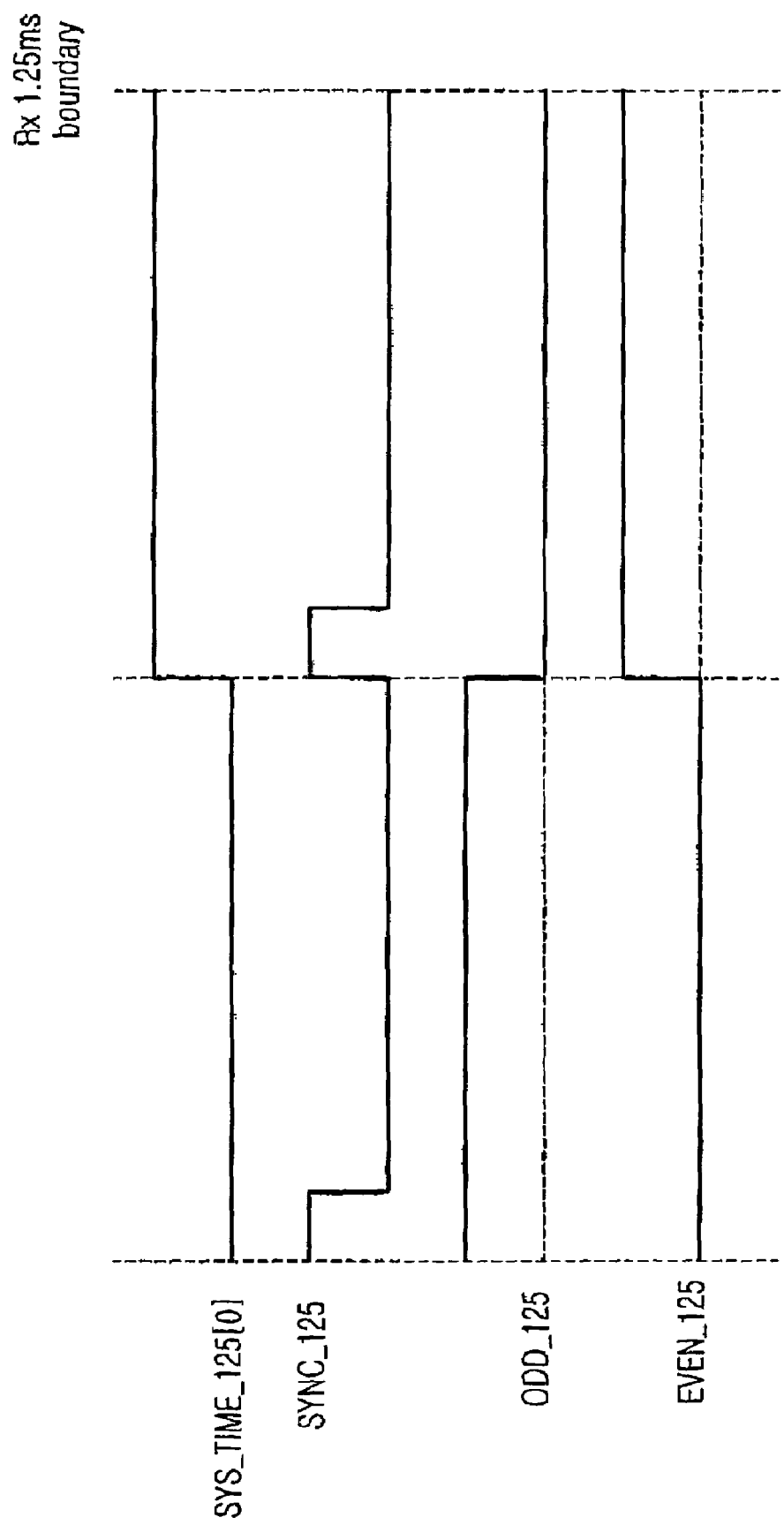
FIG. 11 is an activation control timing diagram illustrating first and second HARQ state machines for ACK/NAK Delay=2 slots according to an embodiment of the present invention.

FIG. 10 is an activation control timing diagram of first and second HARQ state machines for ACK/NAK Delay=1 slot according to the embodiment of the present invention, and FIG. 11 is an activation control timing diagram of first and second HARQ state machines for ACK/NAK Delay=2 slots according to the embodiment of the present invention. With reference to FIGS. 10 and 11, a detailed description will now be made of activation control timing of the first and second HARQ state machines according to the embodiment of the present invention.

In FIGS. 10 and 11, output types are determined by a value of ACK/NAK Delay, a synchronization signal SYNC_125 indicating a slot boundary of a reception stage, and SYSM_TIME_125[0] which is a least significant bit (LSB) of a system time indicating a 1.25 msec unit. First, a description of FIG. 10 will be made. As illustrated, when ACK_DELAY is 1 slot, a first state machine selection signal ODD_125 applied to the first HARQ state machine OHSM and a second state machine selection signal EVEN_125 applied to the second HARQ state machine EHSM are output in a High state and a Low state, respectively. This is to enable only the first HARQ state machine OHSM to perform a state transition operation, and prevent the second HARQ state machine EHSM from performing state transition. Therefore, the system time SYS_TIME_125 alternately holds a Low state and a High state by the 1.25 msec, and the synchronization signal SYNC_125 also instantaneously holds a High state at a start point of a 1.25 msec slot.

Next, with reference to FIG. 11, a description will be made when ACK/NAK Delay is 2 slots. As illustrated in FIG. 11, the first state machine selection signal ODD_125 applied to the first HARQ state machine OHSM alternates between a Low state and a High state by the 1.25 msec. Also, the second state machine selection signal EDD_125 applied to the second HARQ state machine EHSM alternates between a Low state and a High state by the 1.25 msec. In addition, the first state machine selection signal ODD_125 and the second state machine selection signal EVEN_125 always output exclusive states. For example, when the first state machine selection signal ODD_125 is in a High state, the second state machine selection signal EVEN_125 is in a Low state, and when the first state machine selection signal ODD_125 is in a Low state, the second state machine selection signal EVEN_125 is in a High state. The system time signal and the synchronization signal have the same waveforms as the corresponding signals illustrated in FIG. 10.

In the mobile communication system, ACK/NAK Delay becomes an entire system delay time. Therefore, when ACK/NAK Delay is 1 slot, ACK_DELAY can be 0 in the mobile station, and when ACK/NAK Delay is 2 slots, ACK_DELAY can be 1 in the mobile station. As a result, transition to the next state can be illustrated as shown in Table 3 according to current states of the HARQ state machine 310 and signal outputs from the state function section 335.

F3_DONE signal is output from the state function section 335 at a time t4, the first HARQ state machine OHSM transitions

TABLE 3

| Current State | INPUT | | | | | | | NEXT STATE |
|---|---|---|---|---|---|---|---|---|
| | ACK_DELAY | F1_DONE | F2_DONE | F3_DONE | F4_DONE | F5_DONE | F6_DONE | |
| S1 | X | 0 | X | X | X | X | X | S1 |
|    | X | 1 | X | X | X | X | X | S2 |
| S2 | X | X | 000 | X | X | X | X | S2 |
|    | X | X | 001 | X | X | X | X | S2 |
|    | X | X | 010 | X | X | X | X | S2 |
|    | X | X | 011 | X | X | X | X | S2 |
|    | X | X | 100 | X | X | X | X | S3 |
|    | X | X | 101 | X | X | X | X | S1 |
|    | X | X | 110 | X | X | X | X | S6 |
|    | X | X | 111 | X | X | X | X | S6 |
| S3 | 0 | X | X | 0 | X | X | X | S3 |
|    | 0 | X | X | 1 | X | X | X | S5 |
|    | 1 | X | X | 0 | X | X | X | S3 |
|    | 1 | X | X | 1 | X | X | X | S4 |
| S4 | 0 | X | X | X | 0 | X | X | NA |
|    | 0 | X | X | X | 1 | X | X | NA |
|    | 1 | X | X | X | 0 | X | X | S4 |
|    | 1 | X | X | X | 1 | X | X | S5 |
| S5 | X | X | X | X | X | 0 | X | S5 |
|    | X | X | X | X | X | 1 | X | S6 |
| S6 | X | X | X | X | X | X | 0 | S6 |
|    | X | X | X | X | X | X | 1 | S1 |

In Table 3, Fi (where i=1 to 6) refers to an output signal of the state function section 335 in an $i^{th}$ state. For example, F1_DONE refers to an operation-done signal output from the state function section 335 in the first state S1, and F2_DONE means an operation-done signal output from the state function section 335 in the second state S2. In addition, ACK_DELAY refers to a delay time in a mobile station, and a part represented by X refers to "don't care."

Figure 12:
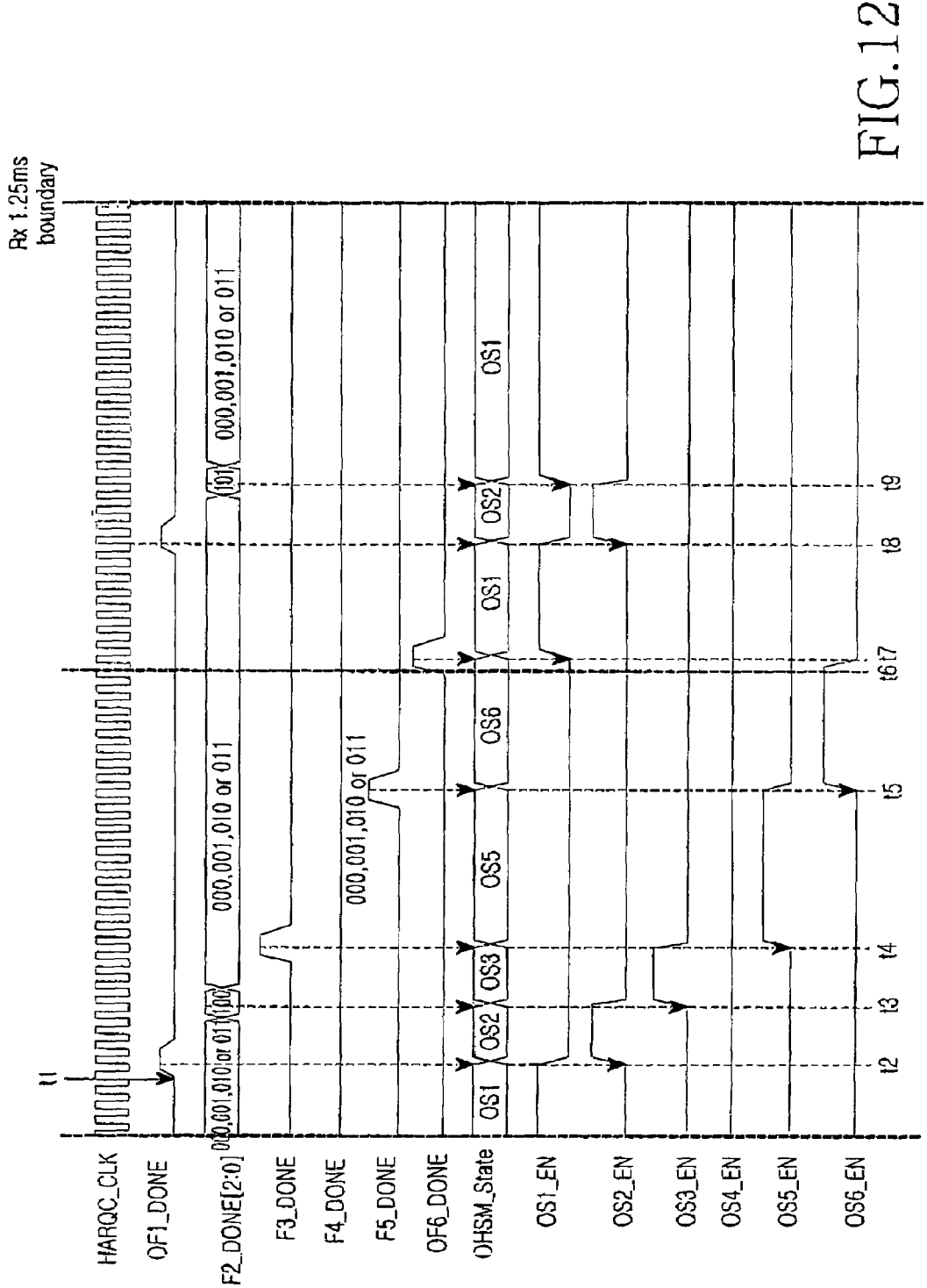
FIG. 12 is a state transition timing diagram illustrating a first HARQ state machine for ACK/NAK Delay=1 slot according to an embodiment of the present invention.

FIG. 12 is a state transition timing diagram of a first HARQ state machine for ACK/NAK Delay=1 slot according to an embodiment of the present invention. With reference to FIG. 12, a detailed description will now be made of a state transition operation of the first HARQ state machine for ACK/NAK Delay=1 slot. In FIG. 12, a state is represented by OSi. That is, OS1 indicates the first state S1, and OS2 indicates the second state S2. In order to indicate a state in the first HARQ state machine OHSM, the states are represented by OS1, OS2, . . . in the drawing.

When the first state S1 is being held, the first HARQ state machine OHSM receives a packet data control channel signal and decodes the received packet data control channel signal. Therefore, the state function section 335 outputs an F1_DONE signal at a particular time t1. The first HARQ state machine OHSM then detects this at a time t2, and transitions to the second state S2. If an F2_DONE signal is output from the state function section 335 while the second state S2 is being held, the first HARQ state machine OHSM holds the second state S2, returns to the first state S1, or transitions to the third state S3 or the sixth state S6. The 4 kinds of state transitions are performed based on the values output from the state function section 335, illustrated in Table 3. FIG. 12 shows transition to the third state S3, the most general state transition, and this will be described below.

When state transition to the third state S3 occurs, the first HARQ state machine OHSM disregards other signals, e.g., F1_DONE or F2_DONE, received from the state function section 335, if any, and determines whether an F3_DONE signal is output from the state function section 335. When the F3_DONE signal is output from the state function section 335 at a time t4, the first HARQ state machine OHSM transitions to the fifth state S5 since ACK/NAK Delay is 1 slot. Thereafter, the first HARQ state machine OHSM waits for an F5_DONE signal to be received from the state function section 335. The state function section 335 outputs F5_DONE when a control operation in the fifth state S5 is done. In FIG. 12, F5_DONE is output at a time t5. When the F5_DONE is output, the first HARQ state machine OHSM transitions to the sixth state S6.

The first HARQ state machine OHSM holds the sixth state S6, and waits for an F6_DONE signal to be output from the state function section 335. As illustrated in FIG. 12, the F6_DONE signal can be output when a 1.25 msec period expires. Since the first HARQ state machine OHSM can transition to the first state S1, its operation is not affected at the next slot. That is, since the first HARQ state machine OHSM can receive the F6_DONE signal at a time t6 and then immediately transition to the first state S1 at a time t7, data processing is not affected at the next slot.

Next, operations in times t7 to t9 will be described. At a time t7, the first HARQ state machine OHSM holds the first state S1. If an F1_DONE signal is received from the state function section 335 at a time t8, the first HARQ state machine OHSM transitions to the second state S2, and then waits for an F2_DONE signal to be output from the state function section 335. The state function section 335 performs a control operation in the second state S2, and outputs an F2_DONE signal when the control operation is completed. Here, if the F2_DONE signal is "101" as shown in Table 3, the first HARQ state machine OHSM transitions to the first state S1 because F2_DONE=101 is a signal requesting transition back to the first state S1. If F2_DONE is "110" or "111" requesting transition to the sixth state S6, the first HARQ state machine OHSM transitions to the sixth state S6.

Figure 13:
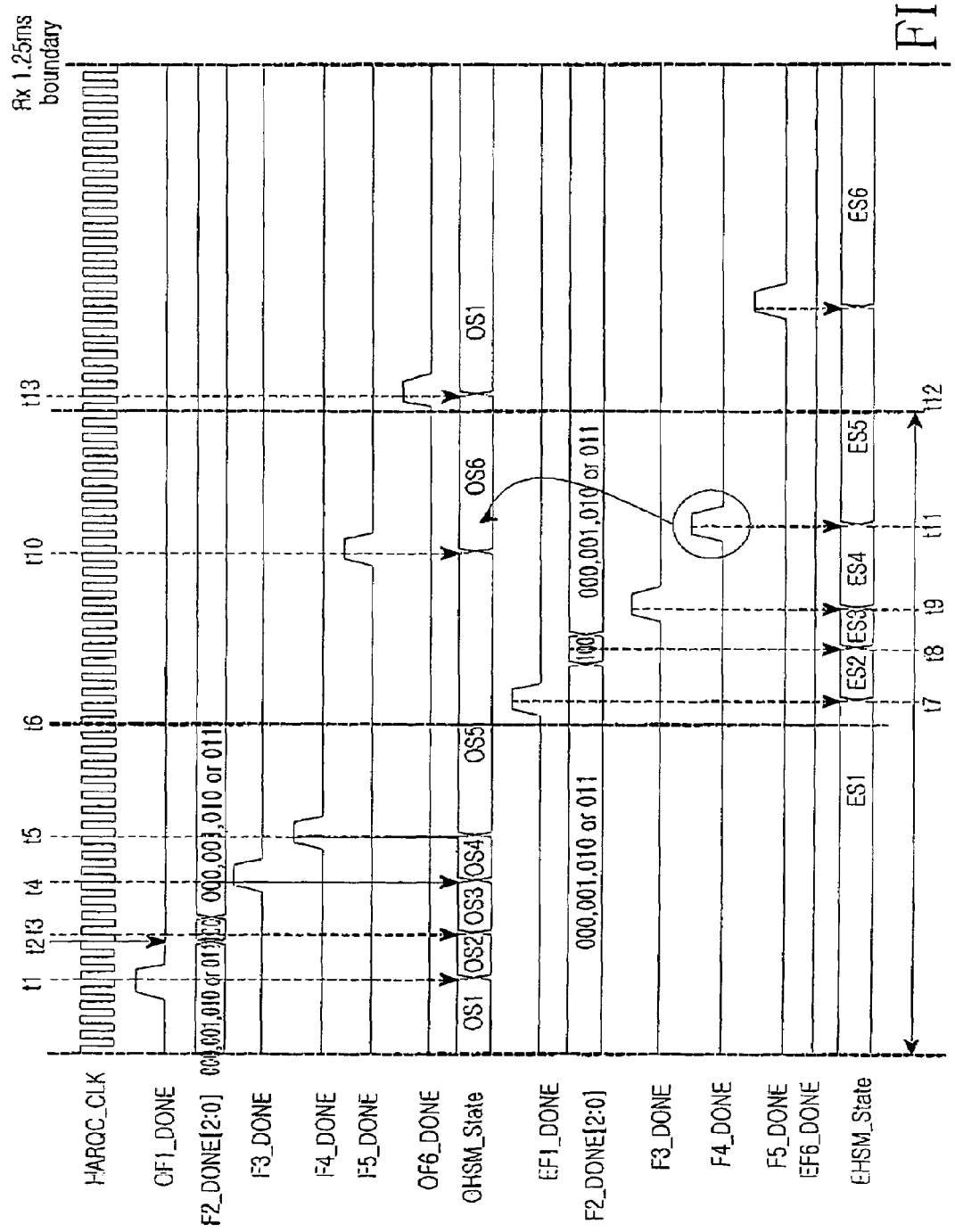
FIG. 13 is a state transition timing diagram illustrating a first HARQ state machine and a second HARQ state machine for ACK/NAK Delay=2 slots according to an embodiment of the present invention.

FIG. 13 is a state transition timing diagram of a first HARQ state machine and a second HARQ state machine for ACK/NAK Delay=2 slots according to an embodiment of the present invention. With reference to FIG. 13, a detailed description will now be made of a state transition operation of a first HARQ state machine OHSM and a second HARQ state machine EHSM for ACK/NAK Delay=2 slots. In FIG. 13, a state of the first HARQ state machine OHSM is represented by OSi. That is, OS1 indicates the first state S1 of the first HARQ state machine, and OS2 indicates the second state S2 of the first HARQ state machine. In order to indicate a state in the first HARQ state machine OHSM, the states are represented by OS1, OS2, . . . in the drawing. A state of the second HARQ state machine is represented by ESi. That is, ES1 indicates the first state S1 of the second HARQ state machine, and ES2 indicates the second state S2 of the second HARQ state machine. In order to indicate a state in the second HARQ state machine EHSM, the states are represented by ES1, ES2, . . . in the drawing. In addition, OFi_DONE and EFi_DONE represent an output to the first HARQ state machine OHSM and an output to the second HARQ state machine EHSM, respectively.

The first HARQ state machine OHSM, when it holds the first state S1, receives a packet data control channel signal and decodes the received packet data control channel signal. Therefore, if the state function section 335 outputs an F1_DONE signal at a particular time t1, the first HARQ state machine OHSM detects this, and then transitions to the second state S2. If an F2_DONE signal is output from the state function section 335 while the second state S2 is being held, the first HARQ state machine OHSM holds the second state S2, returns to the first state S1, or transitions to the third or sixth state S3 or S6 according to the type of output signal. The 4 kinds of state transitions are performed based on the values output from the state function section 335, illustrated in Table 3. FIG. 13 shows transition to the third state S3, the most general state transition, and this will be described below.

When state transition to the third state S3 occurs, the first HARQ state machine OHSM disregards other signals, e.g., F1_DONE or F2_DONE, received from the state function section 335, if any, and determines whether an F3_DONE signal is output from the state function section 335. When the F3_DONE signal is output from the state function section 335 at a time t4, the first HARQ state machine OHSM transitions to the fourth state S4 since ACK/NAK Delay is 2 slots. Thereafter, the first HARQ state machine OHSM transitions to the fifth state S5, when an F4_DONE signal is received from the state function section 335. The fifth state S5 continues over a boundary of a 1.25 msec slot. That is, the first HARQ state machine OHSM continues the fifth state S5 over the 1.25 msec slot's boundary which is a time t6. While holding the fifth state S5 in this way, the first HARQ state machine OHSM waits for an F5_DONE signal to be received.

In the case where the next packet data is received after the time t6, if a first state-done signal F1_DONE is output from the state function section 335 at a time t7, the second HARQ state machine EHSM transitions to the second state S2. If the second state S2 is completed, i.e., if an F2_DONE signal is output from the state function section 335 at a time t8, the second HARQ state machine EHSM transitions to the third state S3. There are 4 possible transitions from the second state S2. FIG. 13 shows transition to the third state S3.

The state function section 335 performs a control operation for the third state S3, and the second HARQ state machine EHSM holds the third state S3. If the control operation for the third state S3 is completed, the state function section 335 outputs an F3_DONE signal at a time t9. The second HARQ state machine EHSM then transitions to the fourth state S4. The second HARQ state machine EHSM holds the fourth state S4 until the first HARQ state machine OHSM ends the fifth state S5. That is, the state function section 335 outputs an F4_DONE signal to the second HARQ state machine EHSM at the next clock of a time t10 at which the fifth state S5 of the first HARQ state machine OHSM is completed. Accordingly, the second HARQ state machine EHSM can transition to the fifth state S5 at a time t11.

In FIG. 13, since ACK/NAK Delay is 2 slots, a sixth state-done signal F6_DONE is output at a time t13 which is the last time of the second 1.25 msec slot. Accordingly, the first HARQ state machine OHSM can transition to the first state S1.

According to the timing diagram of FIG. 13, the state function section 335 must be formed as follows.

First, two first state processors that control the first state S1 must be provided for the first HARQ state machine OHSM and the second HARQ state machine EHSM because the first HARQ state machine OHSM and the second HARQ state machine EHSM can simultaneously hold the first state S1.

Second, since second to fifth state processors controlling the second to fifth states S2 to S5 are not simultaneously held in any case, they are separately formed, and they can be designed so that the output signals are processed in the first HARQ state machine OHSM and the second HARQ state machine EHSM.

Third, the sixth state S6, as mentioned above, is a state that can be simultaneously performed by the first HARQ state machine OHSM and the second HARQ state machine EHSM. Therefore, two sixth state processors that process the sixth state S6 must be provided so as to operate in association with the first HARQ state machine OHSM and the second HARQ state machine EHSM.

That is, the state function section 335 has state processors for corresponding states in order to process internal functions, and the state processors perform operations that must be performed in the respective states. As to the number of the state processors, two state processors are provided for each of the first and sixth processors processing the first and sixth states, and a single state processor is provided for each of the second to fifth state processors. Therefore, the state function section 335 can be comprised of a total of 8 internal blocks.

It can be understood from FIGS. 12 and 13 that the fifth state S5 cannot be simultaneously held. Therefore, ACK/NAK Delay=1 slot and ACK/NAK Delay=2 slots are both satisfied with only one the data channel turbo decoder 430.

Referring to FIG. 5, the output buffer controller 340 will be described. Generally, in a high-speed data modem, e.g., an EV-DV modem, timing and a hardware structure for data exchange with an output buffer of a turbo decoder, an HARQ controller and a processor (CPU or host) must have several characteristics listed below for efficient data transmission. That is, unlike a structure of a signal output buffer used in the existing CDMA2000 1x forward supplemental channel (F-SCH), a structure of an output buffer of a turbo decoder has the following structural characteristics in order to increase a turbo decoding time and a data rate.

(1) Fundamentally, a double output buffer structure is used.

(2) In order to reduce an interrupt handling load of the processor (CPU or host), a maximum of 4 output frames (decoded information blocks or encoder packets) are sequentially stored in the output buffer. Thereafter, all data in the output buffer is transmitted to the processor at the same time after a lapse of a particular time (5 msec at the least).

(3) A variable control method is provided in which a system selects one of two output buffer operating methods according to a change in ACK_DELAY (1 slot or 2 slots) of a particular reverse channel during cell setup.

(4) Since a forward packet data channel (F-PDCH) is packet data, it can transmit data on a non-real-time basis, unlike the existing forward supplemental channel (F-SCH).

However, since a near-real-time service must be supported, F-PDCH should be able to support fast data transmission, if possible.

To this end, unlike the existing F-SCH output buffer, a variable output buffer read/write controller is required. A controller performing such a control operation is an output buffer controller (OBUFC). In the present invention, the output buffer controller 340 satisfying such conditions is included in the HARQ controller 300. That is, in the embodiment of the present invention, as mentioned above, the output buffer controller 340 having a different transmission scheme according to ACK_DELAY is provided and operated in association with the HARQ state machine 310 of the HARQ controller 300.

Figure 14:
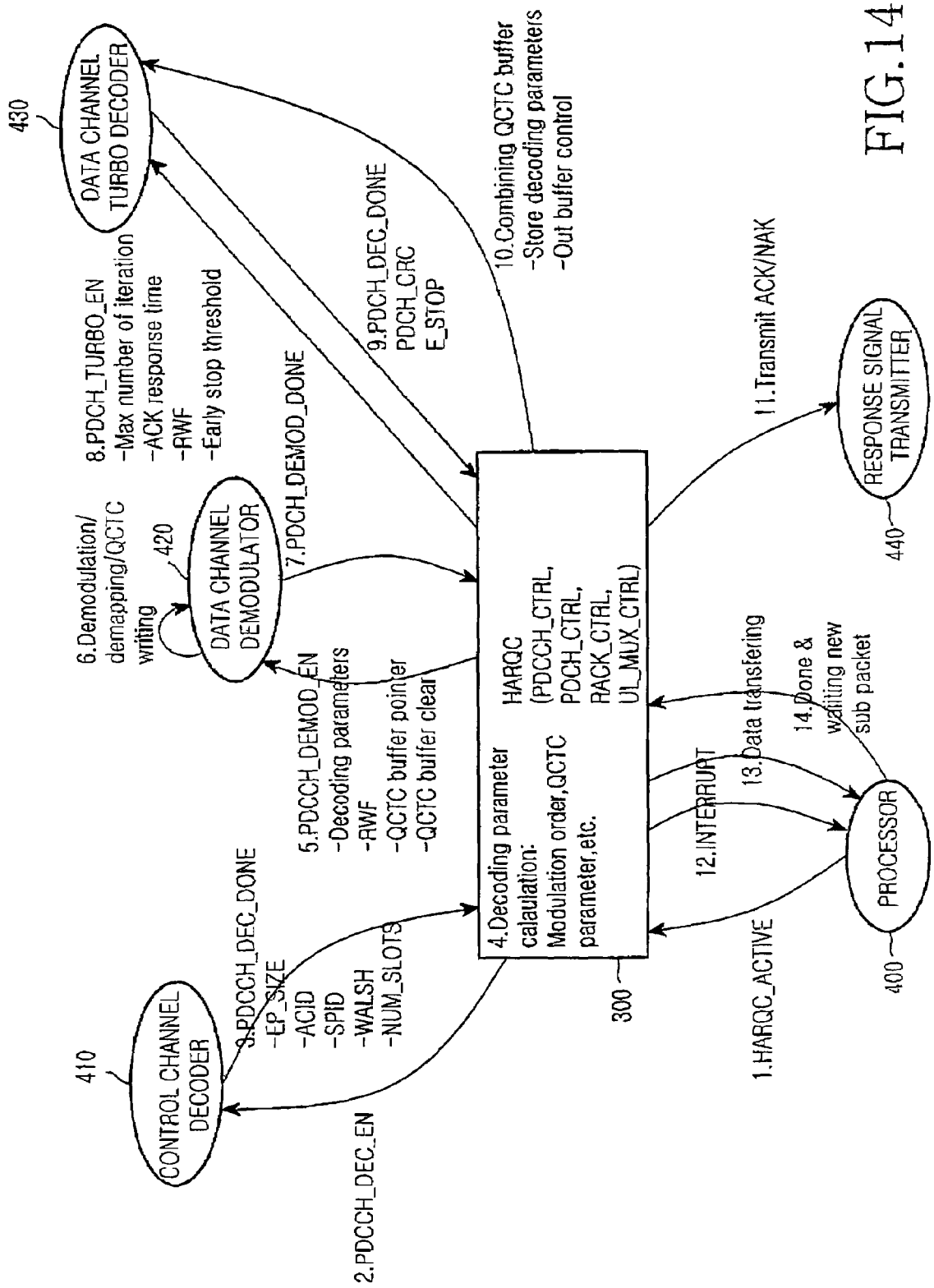
FIG. 14 is a diagram illustrating a control flow between an HARQ controller and its peripheral devices according to an embodiment of the present invention.

FIG. 14 is a diagram illustrating a control flow between an HARQ controller and its peripheral devices according to an embodiment of the present invention. With reference to FIGS. 5 and 14, a detailed description will now be made of a control flow between an HARQ controller and its peripheral devices according to embodiment of the present invention. A description of FIG. 14 will be made in order of reference numerals 1, 2, ..., 14, which represent steps.

Step 1: If a mobile station is set to an EV-DV physical channel setup mode of Radio Configuration 10 (RC-10) which is one of several CDMA2000 1x physical channel setup modes by upper layer signaling, an upper layer transmits an HARQ activation signal HARQ_ACTIVE indicating initiation of an operation of the HARQ controller 300.

Step 2: The HARQ controller 300 enables the control channel decoder 410 by outputting a control channel decoder enable signal PDCCH_DEC_EN to the control channel decoder 410.

Step 3: The control channel decoder 410, if enabled, receives a decoding signal for a forward packet data control channel (F-PDCCH) and performs a decoding operation according to the decoding signal. If decoding is completed, the control channel decoder 410 transmits a control channel decoding-done signal PDCCH_DEC_DONE and decoding-related information to the HARQ controller 300.

Step 4: The HARQ controller 300 determines its next operation using information received in Step 3 from the control channel decoder 410. If a MAC ID in a signal received from the control channel decoder 410 indicates the HARQ controller 300 itself, i.e., if a MAC_ID_OK signal is received, related information for performing a reception operation of forward packet data received over a forward packet data channel (F-PDCH) is generated. However, when the MAC ID does not indicate the HARQ controller 300, the HARQ controller 300 repeatedly performs Step 3 and waits until a MAC ID indicating the HARQ controller 300 is received.

Step 5: If there is a forward packet data channel (F-PDCH) assigned to the mobile station, the HARQ controller 300 outputs a data channel demodulation enable signal PDCH_DEMOD_EN to the data channel demodulator 420 to enable the data channel demodulator 420.

Step 6: Upon receiving the data channel demodulation enable signal, the data channel demodulator 420 performs a demodulation operation, a demapping operation, and a QCTC clearing/combining operation.

Step 7: If an operation of Step 6 is completed, the data channel demodulator 420 delivers a data channel demodulation-done signal to the HARQ controller 300.

Step 8: If a data channel demodulation operation is completed, the HARQ controller 300 outputs a data channel turbo decoder enable signal PDCH_TURBO_EN to the data channel turbo decoder 430 to read code symbols stored in a QCTC buffer. Thereafter, the data channel turbo decoder 430 performs turbo decoding on the read code symbols.

Step 9: If the decoding operation is completed, the data channel turbo decoder 430 outputs a turbo decoding-done signal PDCH_TURBO_DONE to the HARQ controller 300.

Step 10: The HARQ controller 300 performs CRC check using the data decoded by the data channel turbo decoder 430. If a CRC result of the decoded data is "BAD," the HARQ controller 300 directs an operation for improving decoding performance of the data channel turbo decoder 430, and controls an external buffer.

Step 11: The HARQ controller 300 controls the response signal transmitter 440 according to the decoding result or its own decision to transmit ACK or NAK over a reverse response channel (R-ACKCH).

Step 12: The HARQ controller 300 generates an interrupt for transmitting, to the upper layer, data stored in an output buffer after being received over a forward packet data channel and finally decoded by the data channel turbo decoder 430.

Step 13: The upper layer transfers, to its upper layer, forward packet data stored in an output buffer of the data channel turbo decoder 430 in response to the interrupt signal received from the HARQ controller 300.

Step 14: If transfer of received data on a forward packet data channel stored in the output buffer of the data channel turbo decoder 430 is completed, the upper layer informs the HARQ controller 300 that reception of the forward packet data channel is completed.

Now, operations of Step 1 to Step 14 will be described separately for ACK/NAK Delay=1 slot and ACK/NAK Delay=2 slots. First, operations of Step 1 to Step 14 will be described for ACK/NAK Delay=1 slot.

For ACK/NAK Delay=1 slot, an operation of the data channel turbo decoder 430 is completed before each slot. Therefore, the data channel turbo decoder 430 generates an enable signal PDCH_TURBO_EN of the data channel turbo decoder 430 immediately after a demodulation-done signal PDCH_DEMOD_DONE of the data channel demodulator 420. A decoding operation of the data channel turbo decoder 430 is completed within one slot. That is, a range of the maximum time is limited within 1 slot, if a CRC check result for the decoded data from the data channel turbo decoder 430 is "BAD" or "GOOD," or if early stop is performed before a maximum decoding repetition number. Therefore, if it is determined that a decoding operation of the data channel turbo decoder 430 continues for 1 slot or more, the HARQ controller 300 stops the decoding operation by compulsion before a 1-slot boundary. In this manner, the turbo operation is completed within one slot. Since the entire HARQ operation is performed within 1 slot in this way, HARQ operations in which an ARQ channel is received at consecutive slots are performed independent of each other, Next, operations of Step 1 to Step 14 will be described for ACK/NAK Delay=2 slots.

For ACK/NAK Delay=2 slots, the data channel turbo decoder 430 can perform a decoding operation over a first slot boundary up to a second slot boundary after receiving a subpacket. Here, an ARQ channel may be received over consecutive slots. In this case, there is a time period for which HARQ operations are overlapped. Such an overlapping time period is related only to an operation of the data channel turbo decoder 430, and is not related to an operation of the data channel demodulator 420 because the data channel demodulator 420 does not operate over the next slot since a demodulation operation is performed within a 1.25 msec slot where packet data is received. However, the data channel turbo decoder 430 starts its decoding operation at a slot where packet data is received, and ends the decoding operation within the next 1.25 msec slot. Therefore, when data received at a first slot is continuously turbo decoded at a second slot, data received at the second slot is waited until decoding of the data received at the first slot is done. If turbo decoding of the data received at the first slot is completed, turbo decoding is performed on the data received at the second slot. The packet data received at the second slot can also be continuously turbo decoded up to the third slot, like the packet data received at the first slot.

Figure 15:
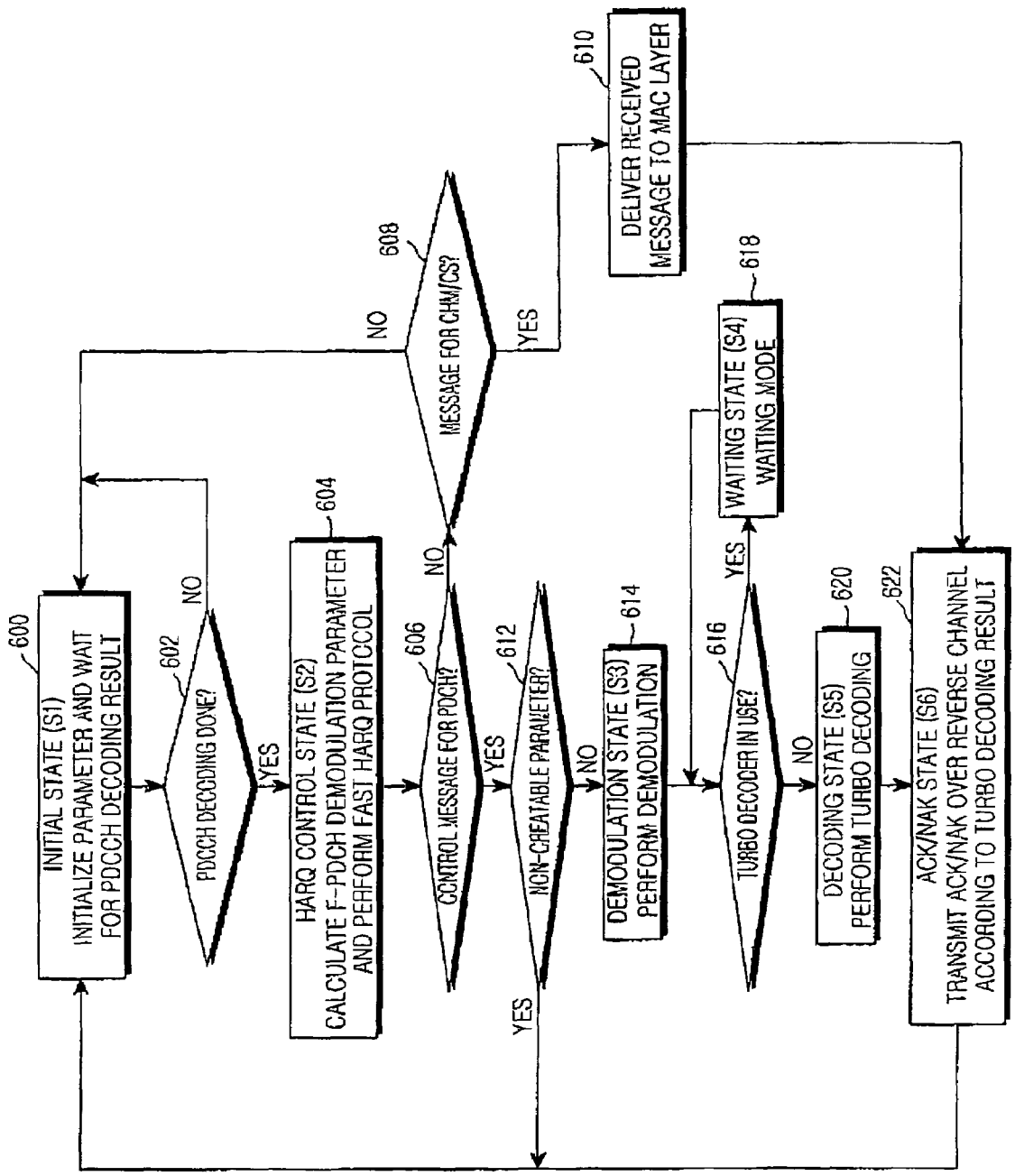
FIG. 15 is a flowchart illustrating a procedure for controlling respective states by an HARQ controller during data reception according to an embodiment of the present invention.

FIG. 15 is a flowchart illustrating a procedure for controlling respective states by an HARQ controller during data reception according to an embodiment of the present invention. With reference to FIG. 15, a detailed description will now be made of a procedure for controlling respective states by an HARQ controller during data reception according to the present invention.

In step 600, the HARQ controller 300 holds an initial state which is the first state S1. In the initial state of the first state S1, the HARQ controller 300 performs parameter initialization, and waits for a decoding result of a packet data control channel (PDCCH) by controlling the control channel decoder 410. While waiting for a decoding result of the packet data control channel, the HARQ controller 300 determines in step 602 whether a decoding-done signal of the packet data control channel is received from the control channel decoder 410. If it is determined in step 602 that a decoding-done signal of the packet data control channel is received, the HARQ controller 300 proceeds to step 604, and if decoding of the packet data control channel is not completed, the HARQ controller 300 continuously performs the step 600. In step 604, the HARQ controller 300 holds a control state of the second state S2. In the second state S2, the HARQ controller 300 calculates a parameter for demodulation of the forward packet data channel and performs a fast HARQ protocol.

Thereafter, the HARQ controller 300 determines in step 606 whether a control message received over the packet data control channel (PDCCH) is a control message for a packet data channel (PDCH). If it is determine in step 606 that a control message for a packet data channel is received, the HARQ controller 300 proceeds to step 612. Otherwise, the HARQ controller 300 proceeds to step 608 where it determines whether a received message is a message for control hold mode/cell switching. The HARQ controller 300 performs such an operation for the following reasons. Generally, in an upper layer, a command for an operation of a control hold mode (CHM) or cell switching (CS) controlled by message exchange between a base station and a mobile station is delivered over a separate control channel. However, when an operation should be rapidly directed, such a command can be delivered from the base station to the mobile station over PDCCH rather than the existing control channel. Therefore, not knowing when the base station will send such a message to the mobile station, the mobile station determines whether such an upper layer control message is received, at each PDCCH decoding, and if such a message is detected, it must be rapidly delivered to the upper layer. If it is determined in step 608 that a message for control hold mode/cell switching is received, the HARQ controller 300 proceeds to step 610 where it delivers the received message to a MAC layer which is its upper layer.

In step 612, the HARQ controller 300 determines whether the parameter calculated in step 604 is a non-creatable parameter. If a non-creatable parameter is detected, the HARQ controller 300 returns to step 600 where it transitions to the first state S1. Otherwise, the HARQ controller 300 proceeds to step 614 where it transitions to the third state S3. In step 614, the HARQ controller 300 performs demodulation by controlling the data channel demodulator 420. Thereafter, if the demodulation is done, the HARQ controller 300 determines in step 616 whether the data channel turbo decoder 430 is in use. If it is determined in step 616 that the data channel turbo decoder 430 is in use, the HARQ controller 300 proceeds to step 618 where it holds a waiting state of the fourth state S4. However, if it is determined in step 616 that the data channel turbo decoder 430 is not in use, the HARQ controller 300 proceeds to step 620 where it holds a decoding state of the fifth state S5. The HARQ controller 300 proceeds from step 616 to step 618 when ACK/NAK Delay is 2 slots and turbo decoding of packet data received at a previous slot is not done.

In step 620, the data channel turbo decoder 430 performs turbo decoding by controlling the data channel turbo decoder 430. If the decoding operation of the data channel turbo decoder 430 is completed, the HARQ controller 300 proceeds to step 622 where it performs the sixth state S6. The sixth state S6 represents an ACK/NAK transmission step, and in the sixth state S6, the HARQ controller 300 controls transmission of ACK/NAK over a reverse channel according to a turbo decoding result output from the data channel turbo decoder 430. Thereafter, the HARQ controller 300 transitions to the first state S1.

As described above, a mobile communication system can reduce a load of an upper layer by disposing a physically structured HARQ controller between a MAC layer and a physical layer, reduce a load of a CPU due to maximum driving clock, and reduce a data processing time. In addition, when N-channel HARQ is supported, the mobile communication system can support both ACK/NAK Delay=1 slot and ACK/NAK Delay=2 slots regardless of the number of channels, preventing an increase in complexity of a mobile station. Moreover, in this manner, it is possible to rapidly deliver control information on a traffic control channel to the upper layer.

While the invention has been shown and described with reference to a certain embodiment thereof, it will be understood by those skilled in the art that various changes in form and details may be made therein without departing from the spirit and scope of the invention as defined by the appended claims.

What is claimed is:

1. An apparatus for use in a mobile communication system that simultaneously transmits a control message over a control channel and data over a data channel, wherein the apparatus supports hybrid automatic repeat request (HARQ), the apparatus comprising:

a physical layer for receiving the control message and the data from the control channel and the data channel respectively and for decoding the received control message and data;

a physical layer's HARQ controller for processing a result of the decoding of at least one of the received control message and data and for controlling the physical layer according to a result of the processing, the physical layer's HARQ controller comprising:

two HARQ state machines for receiving state information from the physical layer and determining a state transition to next state, wherein the two HARQ state machines are selectively enabled based on a number of acknowledgement/negative-acknowledgement (ACK/NAK) processing delay time slots.

2. The apparatus of claim 1, further comprising a data path processor for controlling a processing path of data received over the data channel.

3. The apparatus of claim 1, further comprising an output buffer controller for storing data obtained by demodulating and decoding data received over the data channel and outputting the stored data to the HARQ controller.

4. The apparatus of claim 1, wherein the physical layer comprises one data channel turbo decoder.

5. The apparatus of claim 1, wherein the data channel is decoded by a turbo decoder.

6. The apparatus of claim 1, wherein the physical layer's HARQ controller requests a retransmission of the data from the mobile communication system when results of the decoding of the data indicate that the decoding was unsuccessful.

7. The apparatus of claim 1, wherein the physical layer's HARQ controller transmits the decoded data to an upper layer when results of the decoding of the data indicate that the decoding was successful.

8. The apparatus of claim 1, wherein the physical layer comprises a control channel decoder for decoding the received control messages, a demodulator for demodulating the received data, and a data decoder for decoding the demodulated data.

9. The apparatus of claim 8, wherein the physical layer's HARQ controller determines whether to demodulate the data depending on the decoded control message and outputs the decoded control message to the demodulator and the data decoder when the HARQ controller determines to demodulate the data.

10. The apparatus of claim 1, wherein the physical layer's HARQ controller determines whether to demodulate the data depending on the processed result and outputs the result of the decoded control message to the physical layer when the HARQ controller determines to demodulate the data.

11. The apparatus of claim 1, wherein the physical layer's HARQ controller determines whether to demodulate and decode the received data depending on the result of the decoding of the control message, outputs the decoded control message to the demodulator and the decoder during demodulation, decoding the received data, and controlling the output of a response signal according to the result of the decoding of the data.

12. The apparatus of claim 1, wherein only one of the two HARQ state machines is enabled when the ACK/NAK processing delay is equal to 1 time slot.

13. The apparatus of claim 1, wherein two of the HARQ state machines are enabled when the ACK/NAK processing delay is equal to 2 time slot.

14. The apparatus of claim 13, wherein the two enabled state machines consist of an odd state machine and an even state machine.

15. The apparatus of claim 13, wherein when the ACK/NAK processing delay is equal to 2 time slots, each one of the two enabled HARQ state machines is alternately controlled during the 2 time slots to process the data received over the data channel.

16. The apparatus of claim 15, wherein when decoding the data in the physical layer, the two enabled HARQ state machines control a transition to a waiting state until a previous decoding operation of the decoder has ended.

17. The apparatus of claim 1, further comprising a state function section for controlling the state transition of the two HARQ state machines depending on a result of the determining of the state transition.

18. The apparatus of claim 17, wherein:
the two HARQ state machines control the state transition among a plurality of states, wherein the plurality of states includes an initial state for initializing parameters while waiting for the control message to be received over the control channel, a control message decoding state for decoding the control message, a control state for calculating a result of the control message decoding, a demodulation state for demodulating the received data, a data decoding state for turbo decoding the demodulated data, and a response state for transmitting a response based on a result of the turbo decoding.

19. The apparatus of claim 18, wherein the state function section comprises:
first state processors for performing control operations of the enabled one of two HARQ state machines in the initial state;
a second state processor for performing control operations of the enabled one of the two HARQ state machines in the control state;
a third state processor for performing control operations of the enabled one of the two HARQ state machines in the demodulation state;
a fourth state processor for performing control operations of the enabled one of the two HARQ state machines in the waiting state;
a fifth state processor for performing control operations of the enabled one of the two HARQ state machines in the decoding state; and
sixth state processors for performing control operations of the associated enabled one of the two HARQ state machines in the response state.

* * * * *

UNITED STATES PATENT AND TRADEMARK OFFICE
CERTIFICATE OF CORRECTION

PATENT NO.       : 7,594,153 B2                                          Page 1 of 1
APPLICATION NO.  : 10/691644
DATED            : September 22, 2009
INVENTOR(S)      : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 597 days.

Signed and Sealed this

Fourteenth Day of December, 2010

David J. Kappos
*Director of the United States Patent and Trademark Office*